United States Patent
Inoue

(10) Patent No.: US 9,286,126 B2
(45) Date of Patent: Mar. 15, 2016

(54) INFORMATION PROCESSING APPARATUS, INFORMATION PROCESSING SYSTEM, AND COMPUTER-READABLE STORAGE MEDIUM

(75) Inventor: Eijiro Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 67 days.

(21) Appl. No.: 13/214,278

(22) Filed: Aug. 22, 2011

(65) Prior Publication Data

US 2012/0060212 A1 Mar. 8, 2012

(30) Foreign Application Priority Data

Sep. 3, 2010 (JP) ................................. 2010-198128

(51) Int. Cl.
*G06F 15/173* (2006.01)
*G06F 9/50* (2006.01)

(52) U.S. Cl.
CPC ........ *G06F 9/5038* (2013.01); *G06F 2209/506* (2013.01)

(58) Field of Classification Search
None
See application file for complete search history.

(56) References Cited

U.S. PATENT DOCUMENTS

| | | | |
|---|---|---|---|
| 6,304,892 B1 * | 10/2001 | Bhoj et al. | 709/202 |
| 6,721,554 B2 * | 4/2004 | Gnesda et al. | 455/406 |
| 7,277,948 B2 * | 10/2007 | Igarashi et al. | 709/227 |
| 7,467,192 B1 * | 12/2008 | Lemler et al. | 709/223 |
| 7,600,007 B1 * | 10/2009 | Lewis | 709/223 |
| 7,725,570 B1 * | 5/2010 | Lewis | 709/224 |
| 8,214,533 B2 * | 7/2012 | Nishi | H04L 12/46 709/223 |
| 8,271,655 B2 * | 9/2012 | Dawson et al. | 709/226 |
| 8,285,836 B2 * | 10/2012 | Haga et al. | 709/224 |
| 8,606,924 B2 * | 12/2013 | Gujral et al. | 709/226 |
| 8,612,615 B2 * | 12/2013 | Ferris et al. | 709/229 |
| 8,635,319 B1 * | 1/2014 | Cuthbert et al. | 709/223 |
| 8,713,147 B2 * | 4/2014 | Ferris et al. | 709/223 |
| 8,769,083 B2 * | 7/2014 | Ferris et al. | 709/224 |
| 2001/0025310 A1 * | 9/2001 | Krishnamurthy et al. | 709/223 |
| 2002/0046237 A1 * | 4/2002 | Yokokura | 709/203 |
| 2002/0053033 A1 * | 5/2002 | Cooper et al. | 713/201 |
| 2002/0095399 A1 * | 7/2002 | Devine et al. | 707/1 |
| 2002/0107908 A1 * | 8/2002 | Dharanikota | 709/203 |
| 2002/0165819 A1 * | 11/2002 | McKnight et al. | 705/39 |
| 2003/0069972 A1 * | 4/2003 | Yoshimura et al. | 709/226 |

(Continued)

FOREIGN PATENT DOCUMENTS

| | | |
|---|---|---|
| JP | 2002-116889 | 4/2002 |
| JP | 2002-368750 | 12/2002 |

(Continued)

OTHER PUBLICATIONS

Japanese Office Action dated Feb. 25, 2014.

*Primary Examiner* — Peter Poltorak
(74) *Attorney, Agent, or Firm* — IPUSA, PLLC

(57) ABSTRACT

An information processing apparatus is connectable via a network to service providing devices and a collecting apparatus. The information processing apparatus acquires a selection policy for selecting the devices that lay open to public types of providable services and service level information, and acquires service type information and the service level information from the collecting apparatus which detects the devices and collects the service type information including the types of providable services of the devices and the service level information. The devices capable of providing the accepted type of service are selected according to the selection policy.

16 Claims, 25 Drawing Sheets

(56) References Cited

U.S. PATENT DOCUMENTS

| | | |
|---|---|---|
| 2003/0108049 A1* | 6/2003 | Marilly et al. ............ 370/395.21 |
| 2003/0135609 A1* | 7/2003 | Carlson et al. ................. 709/224 |
| 2003/0167180 A1* | 9/2003 | Chung et al. ........................ 705/1 |
| 2003/0191802 A1* | 10/2003 | Zhao et al. ...................... 709/203 |
| 2004/0024859 A1* | 2/2004 | Bloch et al. .................... 709/223 |
| 2004/0030777 A1* | 2/2004 | Reedy et al. .................... 709/224 |
| 2004/0174823 A1* | 9/2004 | Steele et al. ................... 370/252 |
| 2005/0055220 A1* | 3/2005 | Lee et al. ............................ 705/1 |
| 2005/0125738 A1 | 6/2005 | Srivastava et al. |
| 2005/0228856 A1* | 10/2005 | Swildens et al. .............. 709/200 |
| 2005/0283539 A1* | 12/2005 | Betts et al. ..................... 709/245 |
| 2006/0168075 A1* | 7/2006 | Kitada et al. .................. 709/206 |
| 2006/0235973 A1* | 10/2006 | McBride et al. ............... 709/226 |
| 2007/0226294 A1* | 9/2007 | Pruitt et al. .................... 709/203 |
| 2008/0112429 A1* | 5/2008 | McKinnon et al. ........... 370/442 |
| 2009/0077663 A1* | 3/2009 | Sun et al. ......................... 726/23 |
| 2010/0097950 A1* | 4/2010 | Jeon ............................... 370/252 |
| 2010/0142369 A1* | 6/2010 | Gottwerth et al. ............. 370/225 |
| 2010/0150393 A1* | 6/2010 | Ni et al. .......................... 382/100 |
| 2010/0175112 A1* | 7/2010 | Loeb et al. ......................... 726/4 |
| 2010/0218104 A1* | 8/2010 | Lewis ............................. 715/736 |
| 2011/0016214 A1* | 1/2011 | Jackson .......................... 709/226 |
| 2011/0022642 A1* | 1/2011 | deMilo et al. ................. 707/805 |
| 2011/0087726 A1* | 4/2011 | Shim et al. ..................... 709/203 |
| 2011/0138048 A1* | 6/2011 | Dawson et al. ................ 709/226 |
| 2011/0173108 A1* | 7/2011 | Rajasekar et al. ............... 705/34 |
| 2011/0238724 A1* | 9/2011 | Kim .................... H04L 12/2834 709/201 |
| 2012/0030338 A1* | 2/2012 | Zhang et al. ................... 709/223 |

FOREIGN PATENT DOCUMENTS

| | | |
|---|---|---|
| JP | 2004-259092 | 9/2004 |
| JP | 2006-011748 | 1/2006 |
| JP | 2008-537829 | 9/2008 |

* cited by examiner

FIG.9

| ID | CLOUD SERVICE DEVICE NAME | SLA INFO | USABLE SERVICE |
|---|---|---|---|
| 1 | DEVICE A | →TO SLA EVALUATION DB | FILE STORAGE |
| 2 | DEVICE B | →TO SLA EVALUATION DB | IMAGE READ |
|   |   |   | PRINT |
| 3 | DEVICE C | →TO SLA EVALUATION DB | IMAGE READ |
|   |   |   | FAX TRANSMISSION |
|   |   |   | FAX RECEPTION |
|   |   |   | PRINT |
| 4 | SERVER B | →TO SLA EVALUATION DB | MAIL TRANSMISSION |
|   |   |   | MAIL RECEPTION |
| 5 | SERVER C | →TO SLA EVALUATION DB | OCR |
|   |   |   | INTERNET FAX TRANSMISSION |
|   |   |   | INTERNET FAX RECEPTION |
| 6 | SERVER F | →TO SLA EVALUATION DB | OCR |
| 7 | SERVER G | →TO SLA EVALUATION DB | MAIL TRANSMISSION |
|   |   |   | MAIL RECEPTION |
| 8 | SERVER H | →TO SLA EVALUATION DB | LANGUAGE TRANSLATION |

FIG.10A

| TYPE | SERVICE LEVEL ITEM | PRESCRIBED CONTENT | INFO COLLECTED BY SERVER A FROM EACH CLOUD SERVER/DEVICE | | SCORE EVALUATION BY SERVER A BASED ON EVALUATION RULE | |
|---|---|---|---|---|---|---|
| | | | UNIT | SET VALUE | ITEM SCORE | TYPE SCORE |
| Availability | Service time | Time band in which service is provided (including planned stop time for inspection/maintenance of equipment, network, etc.) | Time band | 24 hours 365 days | 5 | 34 |
| | Planned stop schedule notification | Advance notice confirmation related to periodic maintenance stop (including timing/method of advance notice) | Yes/No | Yes & mail notification 30 days prior | 4 | |
| | Service utilization rate | Probability that service is usable ({(planned service time)−(stop time)}/(planned service time)) | Utilization efficiency (%) | 99.9% or higher | 5 | |
| | Disaster recovery | System recovery/support system when disaster occurs | Yes/No | Yes | 5 | |
| | Substitute means at time of serious fault | Substitute means for case in which early recovery is impossible | Yes/No | Yes | 5 | |
| | Data format provided by substitute means | Definition of data format provided by substitute means | Yes/No (File format) | Yes & provide by CSV | 5 | |
| | Upgrade policy | Policy of version upgrading/modification management/batch management | Yes/No | Yes | 5 | |

| | | | | |
|---|---|---|---|---|
| | | | | 28 |
| Reliability | Average recovery time | Average time from fault generation to repair completion ((sum of repair times)/(number of fault generation)) | Time | Within 1 hour | 3 |
| | System monitoring standard | Monitoring based on settings of system monitoring standard (monitoring contents/monitoring & notification standards) | Yes/No | Yes | 5 |
| | Fault notification process | Notifying process at time of fault generation (notifying destination/method/route) | Yes/No | Yes & notify specified emergency contact by mail /telephone | 5 |
| | Fault notification time | Time required to notify specified destination after abnormality detection | Time | Within 15 minutes | 4 |
| | Fault monitoring interval | Time interval at which fault incidents are collected/totaled | Time (minutes) | Within 1 minute | 5 |
| | Reporting method/ interval for service providing status | Method/time interval for reporting service providing status | Time | Publish on homepage once a month | 3 |
| | Log acquisition | Type of log providable to user (access log, operation log, error log, etc.) | Yes/No | Yes & security log/backup acquisition result log | 3 |

| | | | | | |
|---|---|---|---|---|---|
| Performance | Online response time | Response time of online process | Time (seconds) | Within 3 seconds (average response time within data center) | 4 | 6 |
| | Batch processing time | Response time of batch process (single process) | Time (minutes) | Within 4 hours | 2 | |
| | Customizability | Condition of customizable (modifiable) item/range/ specification/etc. & information required for customization | Yes/No | Yes | 5 | |
| Extensibility | External extensibility | Connecting specifications to existing system or other external system such as SaaS, etc. (API, development language, etc.) | Yes/No | Yes & API | 3 | 11 |
| | Number of simultaneously connected users | Number of simultaneously connectable online users who may use the services | Account (restricting condition) | 50 | 3 | |
| Sum total Score | | | | | 79 | |

FIG.11A

| SERVICE LEVEL ITEM | | SET VALUE | EVALUATION SCORE |
|---|---|---|---|
| SERVICE TIME | | 24 hours 365 days | 5 |
| | | Stop 24 hours or less in 1 year | 4 |
| | | Stop 48 hours or less in 1 year | 3 |
| | | Stop 72 hours or less in 1 year | 2 |
| | | Stop 96 hours or less in 1 year | 1 |
| | | Stop longer than above or unknown | 0 |
| SERVICE UTILIZATION RATE | | 99.9% or higher | 5 |
| | | 99.0% – 99.8% | 4 |
| | | 98.0% – 98.9% | 3 |
| | | 97.0% – 97.9% | 2 |
| | | 96.0% – 96.9% | 1 |
| | | Lower than above or unknown | 0 |
| DISASTER RECOVERY | | Yes | 5 |
| | | No or unknown | 0 |
| SUBSTITUTE MEANS AT TIME OF SERIOUS FAULT | | Yes | 5 |
| | | No or unknown | 0 |
| UPGRADE POLICY | | Yes | 5 |
| | | No or unknown | 0 |

| | | |
|---|---|---|
| AVERAGE RECOVERY TIME | Within 15 minutes | 5 |
| | Within 30 minutes | 4 |
| | Within 1 hour | 3 |
| | Within 3 hours | 2 |
| | Within 5 hours | 1 |
| | Longer than above or unknown | 0 |
| SYSTEM MONITORING STANDARD | Yes | 5 |
| | No or unknown | 0 |
| FAULT NOTIFICATION TIME | Within 5 minutes | 5 |
| | Within 15 minutes | 4 |
| | Within 30 minutes | 3 |
| | Within 1 hour | 2 |
| | Within 3 hours | 1 |
| | Longer than above or unknown | 0 |
| FAULT MONITORING INTERVAL | Within 1 minute | 5 |
| | Within 3 minutes | 4 |
| | Within 5 minutes | 3 |
| | Within 10 minutes | 2 |
| | Within 15 minutes | 1 |
| | Longer than above or unknown | 0 |
| REPORTING METHOD/INTERVAL FOR SERVICE PROVIDING STATUS | Once a day | 5 |
| | Once a week | 4 |
| | Once a month | 3 |
| | Once every 3 months | 2 |
| | Once every 6 months | 1 |
| | Less frequent than above or unknown | 0 |
| ... | | |

FIG.12

| USER NAME | POLICY | CONDITION | |
|---|---|---|---|
| AAA | PRIORITY ON SUM TOTAL SCORE | — | ⇒ (AUTOMATIC SELECTION OF CLOUD COMBINATION WITH HIGHEST SUM TOTAL SCORE OF SLA) |
| BBB | PRIORITY ON AVAILABILITY SCORE | — | ⇒ (AUTOMATIC SELECTION OF CLOUD COMBINATION WITH HIGHEST AVAILABILITY SCORE OF SLA) |
| CCC | CONDITION SPECIFYING | Availability score is 34 points or higher, reliability score is 28 points or higher, & inquire for other conditions | ⇒ (AUTOMATIC SELECTION OF CLOUD COMBINATION SATISFYING SCORE CONDITION OF SLA) |
| DDD | CONDITION SPECIFYING | Reliability score is 32 points or higher, & interrupt process for other conditions | ⇒ (AUTOMATIC SELECTION OF CLOUD COMBINATION SATISFYING SCORE CONDITION OF SLA) |
| | | | |

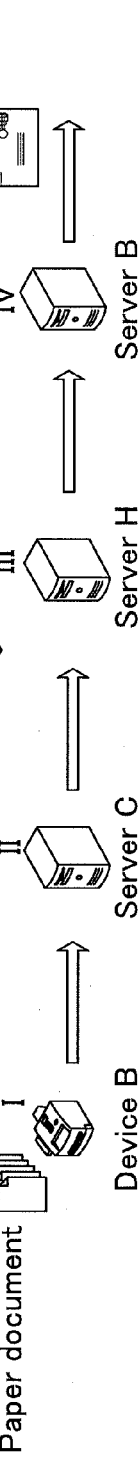

FIG.17

Policy of user CCC: Availability score is 34 points or higher, reliability score is 28 points or higher

| USER NAME | POLICY | CONDITION |
|---|---|---|
| AAA | PRIORITY ON SUM TOTAL SCORE | — |
| BBB | PRIORITY ON AVAILABILITY SCORE | — |
| CCC | CONDITION SPECIFYING | Availability score is 34 points or higher, reliability score is 28 points or higher, & inquire for other conditions |
| DDD | CONDITION SPECIFYING | Reliability score is 32 points or higher, & interrupt process for other conditions |

EXTRACT PROCESS FLOW CANDIDATE & JUDGE CONDITION ⇨

Combination of device B→server C→server H →server B matches policy of user CCC

| Process flow | | I Document read→ | II OCR→ | III Translation→ | IV E-mail transmission | SLA sum total average P | SLA availability average P | SLA reliability average P | SLA performance average P | SLA extensibility average P |
|---|---|---|---|---|---|---|---|---|---|---|
| Candidate of clouds to be used | No.1 | Device B | Server C | Server H | Server B | 78 | 34 | 28 | 5 | 11 |
| | No.2 | | | | Server G | 74 | 32 | 27 | 5 | 10 |
| | No.3 | | Server F | | Server B | 81 | 33 | 31 | 6 | 11 |
| | No.4 | | | | Server G | 72 | 31 | 26 | 5 | 10 |

DETERMINE CLOUD COMBINATION & EXECUTE PROCESS

Paper document — Device B — I → Server C — II → Server H — III → Server B — IV → E-mail

INFORMATION PROCESSING APPARATUS, INFORMATION PROCESSING SYSTEM, AND COMPUTER-READABLE STORAGE MEDIUM

CROSS-REFERENCE TO RELATED APPLICATIONS

This application claims the benefit of a Japanese Patent Application No. 2010-198128 filed on Sep. 3, 2010, in the Japanese Patent Office, the disclosure of which is hereby incorporated by reference.

BACKGROUND OF THE INVENTION

1. Field of the Invention

The present invention relates to an information processing apparatus, an information processing system, and a non-transitory computer-readable storage medium which may select a service providing device in order to utilize services provided by the service providing device. The present invention also relates to a method of determining such a service providing device.

2. Description of the Related Art

A service called cloud computing provides services using resources on a network. A user may use the cloud computing without being aware of the existence or location of the resources. For example, the user may achieve the user's goal by sending information to a server on the network, in order for unspecified servers (or a cloud of computers) to perform processes on the information, such as storing, analyzing, and converting.

Conventionally, the cloud computing refers to a service receivable by the general user mainly via a public network. However, there is also a type of cloud computing that provides a service only to a particular user via an intranet of a company, for example. In order to distinguish the two types of cloud computing, the first type will be referred to as "public cloud computing", and the latter type will be referred to as "private cloud computing".

In the case of the private cloud computing, there is no need for the user to be aware of the resources, and the user may access a specific server in order to receive a service that is provided. According to a Japanese Laid-Open Patent Publication No. 2008-537829, for example, the cloud computing may not be intended, however, a policy executing module enables an authenticated client to make access to a service network, by executing a rule for client access to the service network according to an authentication policy of the service network. The policy executing module may further enable the authenticated client to permit other clients within the service network to use the service network.

An index called SLA (Service Level Agreement) may indicate a service level of the cloud computing. Each cloud service provider may lay open to public its SLA on a Web site, for example, and inform the service level of the cloud computing provided thereby in order to attract potential clients who may wish to sign a contract to use the cloud computing service.

The services or processes provided by the cloud computing service may include a logical data processing and/or a physical data processing such as printing. A result may be obtained by appropriately combining the types of cloud computing and the types of services depending on the user's purpose for using the cloud computing service. Hence, it may be rational for the user to wish receiving an optimum service that is provided every time a service is used by referring to the SLA.

However, it may be difficult for the user to select and combine the services to obtain an optimum combination by referring to a large number of SLAs that are laid open to public individually by each of the cloud service providers, because of time constraints and also because no technique has been established that may help with the user's selection of the services.

SUMMARY OF THE INVENTION

Accordingly, it is a general object in one embodiment of the present invention to provide a novel and useful information processing apparatus, information processing system, method of determining a service providing device, and non-transitory computer-readable storage medium, in which the problem described above may be suppressed.

Another and more specific object in one embodiment of the present invention is to provide an information processing apparatus, an information processing system, a method of determining a service providing device, and a non-transitory computer-readable storage medium, which may dynamically select cloud services depending on the user's purpose or needs.

According to one aspect of the present invention, there is provided an information processing apparatus connectable via a network to a plurality of service providing devices and a predetermined information processing apparatus, including a processing unit having a accepting part configured to accept an input of a type of service; a policy acquiring part configured to acquire a selection policy for selecting the service providing devices that lay open to public types of providable services and service level information; an information acquiring part configured to acquire service type information and the service level information from the predetermined information processing apparatus which detects the service providing devices and collects the service type information including the types of providable services of the service providing devices and the service level information; a selecting part configured to select the service providing devices capable of providing the type of service accepted by the accepting part based on the service type information; and a determining part configured to determine one or more service providing devices from the service providing devices selected by the selecting part according to the selection policy.

According to another aspect of the present invention, there is provided an information processing system including a plurality of service providing devices configured to lay open to public service types that are providable thereby and service level information; an information processing apparatus coupled to the service providing devices via a network and configured to receive services from the service providing devices; a detecting part configured to detect the service providing devices on the network; a collecting part configured to collect service type information including the service type providable by the service providing devices and the service level information; an accepting part configured to accept input of the service type; a policy acquiring part configured to acquire a selection policy for selecting the service providing devices; an information acquiring part configured to acquire the service type information and the service level information from the information processing apparatus; a selecting part configured to select the service providing devices capable of providing the type of service accepted by the accepting part based on the service type information; and a determining part configured to determine one or more service providing devices from the service providing devices selected by the selecting part according to the selection policy.

According to still another aspect of the present invention, there is provided an information processing apparatus connectable to a predetermined information processing apparatus via a network, the predetermined information processing apparatus including a policy acquiring part configured to acquire a selection policy for selecting the service providing devices that lay open to public types of providable services and service level information, an information acquiring part configured to acquire service type information and the service level information from the predetermined information processing apparatus which detects the service providing devices and collects the service type information including the types of providable services of the service providing devices and the service level information, a selecting part configured to select the service providing devices capable of providing the type of service accepted by the accepting part based on the service type information, and a determining part configured to determine one or more service providing devices from the service providing devices selected by the selecting part according to the selection policy, wherein the information processing apparatus includes a processing unit having a device detecting part configured to detect the service providing devices; a device information collecting part configured to collect the service type information including the types of services providable by the service providing devices and the service level information; and a sending part configured to send the service type information and the service level information to the predetermined information processing apparatus.

Other objects and further features of the present invention will be apparent from the following detailed description when read in conjunction with the accompanying drawings.

BRIEF DESCRIPTION OF THE DRAWINGS

FIG. 9 is a diagram illustrating an example of a cloud service database;

FIGS. 10A, 10B and 10C are diagrams illustrating an example of a SLA information database;

FIGS. 11A and 11B are diagrams illustrating an example of an evaluation rule to evaluate SLA information and convert evaluation results into evaluation scores;

FIG. 12 is a diagram illustrating an example of a policy table that is set with information indicating how a cloud computing user wishes to perform a process using the cloud service device;

FIG. 17 is a diagram for explaining an example of a procedure in which a cloud service combination is selected from candidates of cloud service combinations according to a user policy;

DESCRIPTION OF THE PREFERRED EMBODIMENTS

Figure 1:
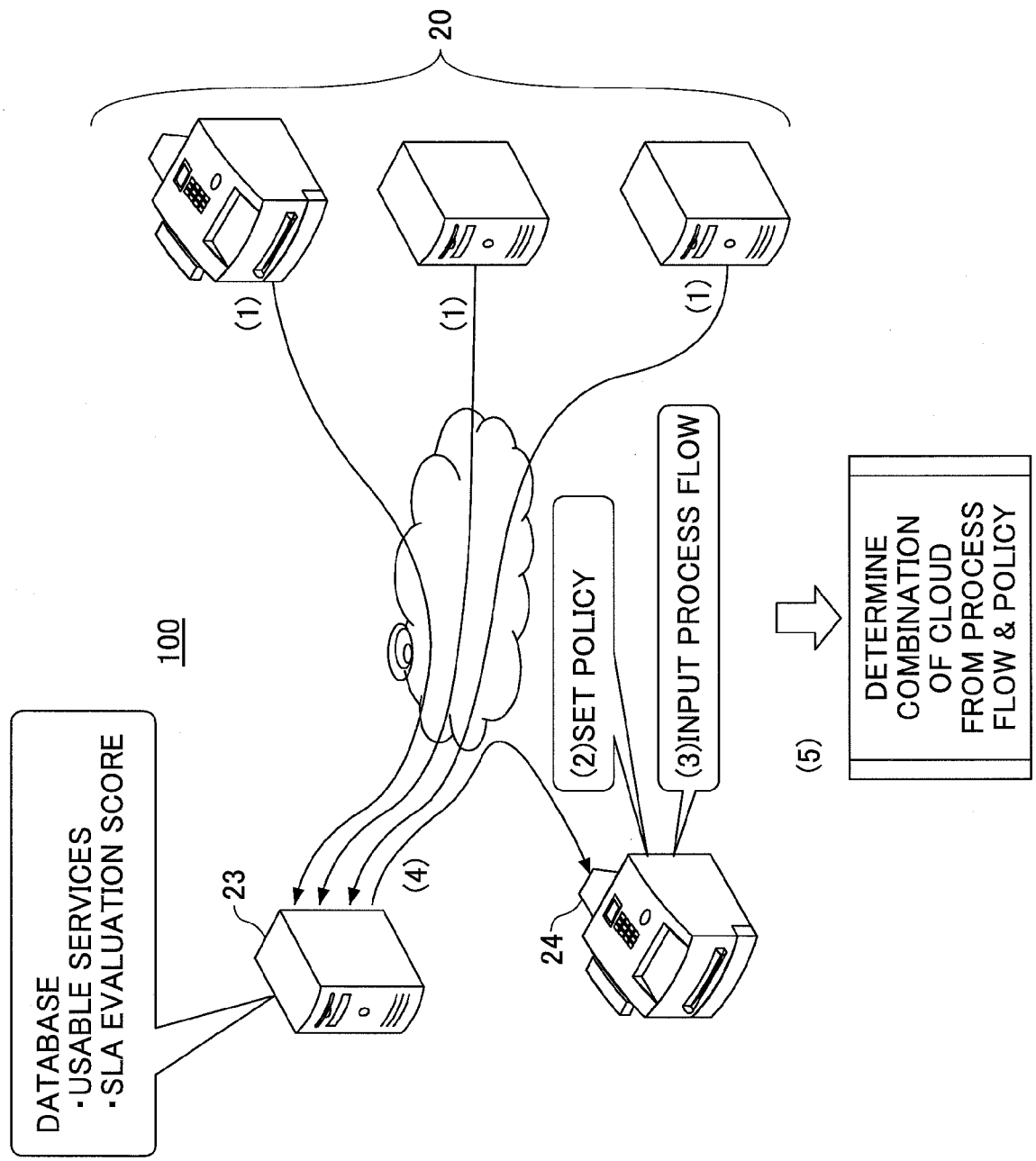
FIG. 1 is a diagram for explaining an example of an information processing system.

A description will be given of embodiments of an information processing apparatus, an information processing system, a method of determining a service providing device, and a non-transitory computer-readable storage medium according to the present invention, by referring to the drawings.

FIG. 1 is a diagram for explaining an example of the information processing system. In an information processing system 100 illustrated in FIG. 1, a cloud service information collecting device 23 is connected to various devices 20 and 24 via a network. A user may receive a service that is provided by operating one of the devices 20 and 24. It is assumed for the sake of convenience that the user operates the device 24, for example, in order to receive the service that is provided. However, in order to receive the service that is provided, it is unnecessary for the user to be aware of the functions of the cloud service devices 20 to be used, the locations of the cloud service devices 20, and the functions of the cloud service devices 20 at each of the locations. In other words, the information processing system 100 illustrated in FIG. 1 provides the services in the form of the so-called cloud computing.

Next, a description will be given of a general process, including the following steps (1) through (5), performed in the information processing system 100.

In a step (1), the cloud service information collecting device 23 periodically communicates with the cloud service devices 20 via the network, for example, and collects usable services that may be provided by the cloud service devices 20 and SLA information of the cloud service devices 20. In addition, the cloud service information collecting device 23 converts the SLA information into a SLA evaluation score (or point).

In a step (2), the user sets the user's policy by operating the device 24, for example. The user policy that is set is stored in the device 24 or the cloud service information collecting device 23.

In a step (3), the user inputs a process flow by operating the device 24, in order to receive the services. The process flow represents particular contents of processes, and may be regarded as being a combination of usable services.

In a step (4), the device 24 downloads the usable services and the SLA evaluation score from the cloud service information collecting device 23.

In a step (5), the device 24 determines the cloud service devices 20 that may perform the processes included in the process flow by referring to the usable services. In addition, the device 24 selects from the determined cloud service devices 20 the cloud service devices 20 that conform to the user policy based on the SLA evaluation scores.

In the case of a relatively simple process flow, only one cloud service device 20 may be selected. However, as the process flow becomes relatively complex, a combination of a plurality of selected cloud service devices 20 may be determined depending on the user policy.

Accordingly, in the information processing system 100, each of the devices 20 and 24 lays open to the public the SLA information thereof via the network. The cloud service information collecting device 23 collects the SLA information and forms a database of SLA evaluation scores by numerically evaluating SLA information, so that the user may select an optimum combination of the devices 20 based on the SLA evaluation scores every time the user wishes to receive the services. Hence, the information processing system 100 may dynamically select the combination of the devices 20 with respect to the process flow that is input by the user, in order to provides the services of the cloud computing.

[Structure]

Figure 2:
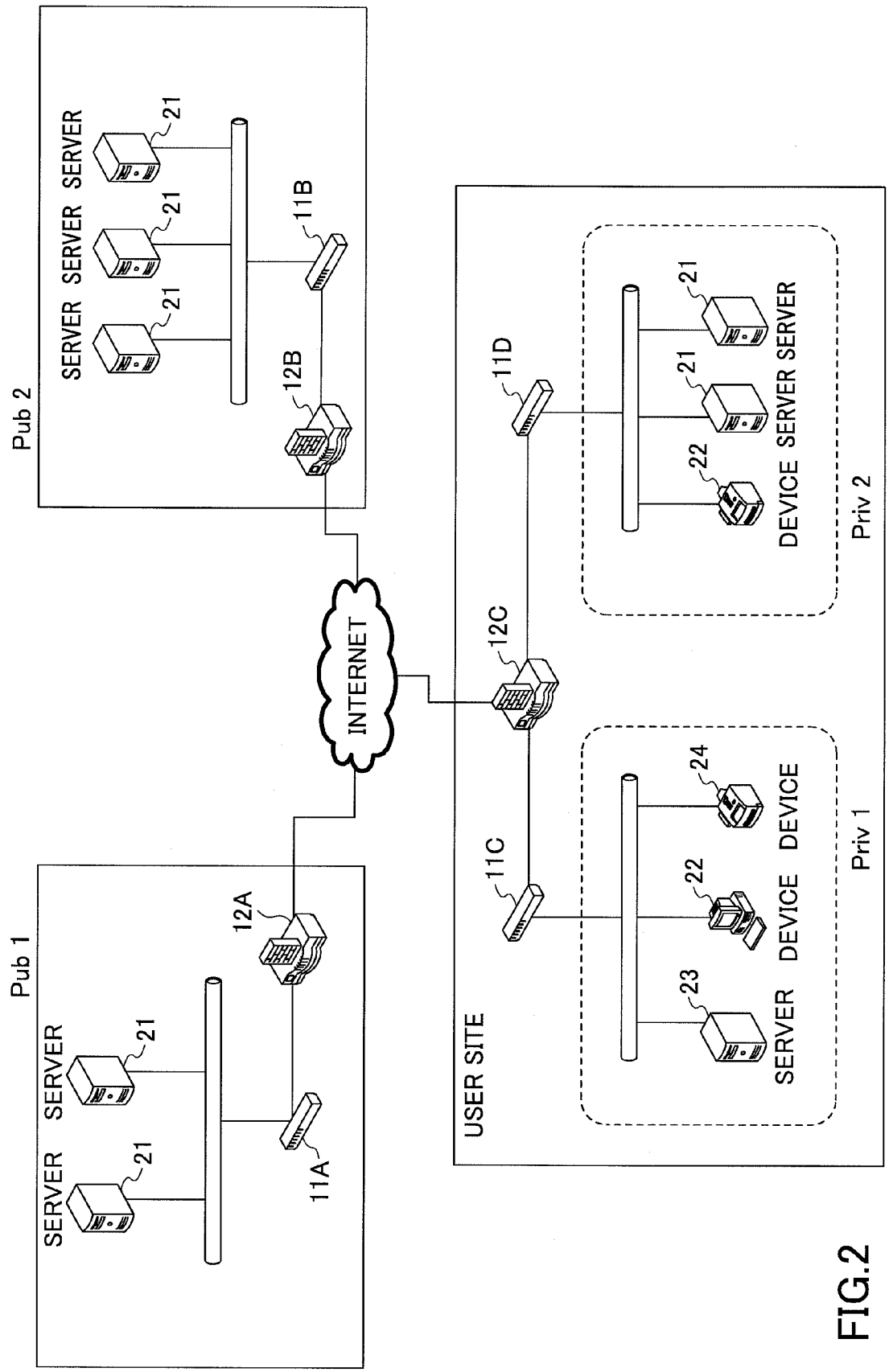
FIG. 2 is a diagram illustrating an example of a structure of the information processing system.

FIG. 2 is a diagram illustrating an example of a structure of the information processing system. In a cloud computing environment, each segment on the network may be regarded as a constituent element of a "cloud". Each segment refers to a group having an IP (Internet Protocol) address and a network address determined by a subnet mask.

The user at a user site recognizes each of external segments connected via the Internet as public clouds pub1, pub2, etc. in FIG. 2, and recognizes each of internal segments connected via an intranet (or enterprise LAN (Local Area Network)) as private clouds priv1, priv2, etc. in FIG. 2.

In FIG. 2, the segment of the public cloud pub1 is connected to a firewall 12A, and the segment of the public cloud pub2 is connected to a firewall 12B. Servers 21 of the public cloud pub1 are connected to the firewall 12A via a switch 11A. Servers 21 of the public cloud pub2 are connected to the firewall 12B via a switch 11B.

The segment of the private cloud priv1 and the segment of the private cloud priv2 are connected to a firewall 12C. Devices 22 and 24 and a server 23 of the private cloud priv1 are connected to the firewall 12C via a switch 11C. Servers 21 and a device 22 of the private cloud priv2 are connected to the firewall 12C via a switch 11D.

Each of the servers 21 and devices 22 within each segment lays open to public the services provided thereby so that the services may be used by other devices 22 and 24 via the network. A contract is signed by the user beforehand in order for the use to use the public cloud. The use of the private cloud from the outside via the Internet may be extremely difficult.

When referring to the server 21 or the device 22 within the segment without distinguishing between the server 21 and the device 22, the server 21 or the device 22 will hereinafter also be referred to as a cloud service device 20. In addition, although the device 24 is also one of the cloud service devices 20, the cloud service device 20 that is operated by the user at the user site (private cloud priv1 or priv2) will be referred to as the device 24 in order to distinguish the cloud service device 20 that is operated by the user from the other cloud service devices 20. Furthermore, the server 23 will be referred to as the cloud service information collecting device 23. In other words, all of the servers 21 and the devices 22 are the cloud service devices 20.

Figure 3:
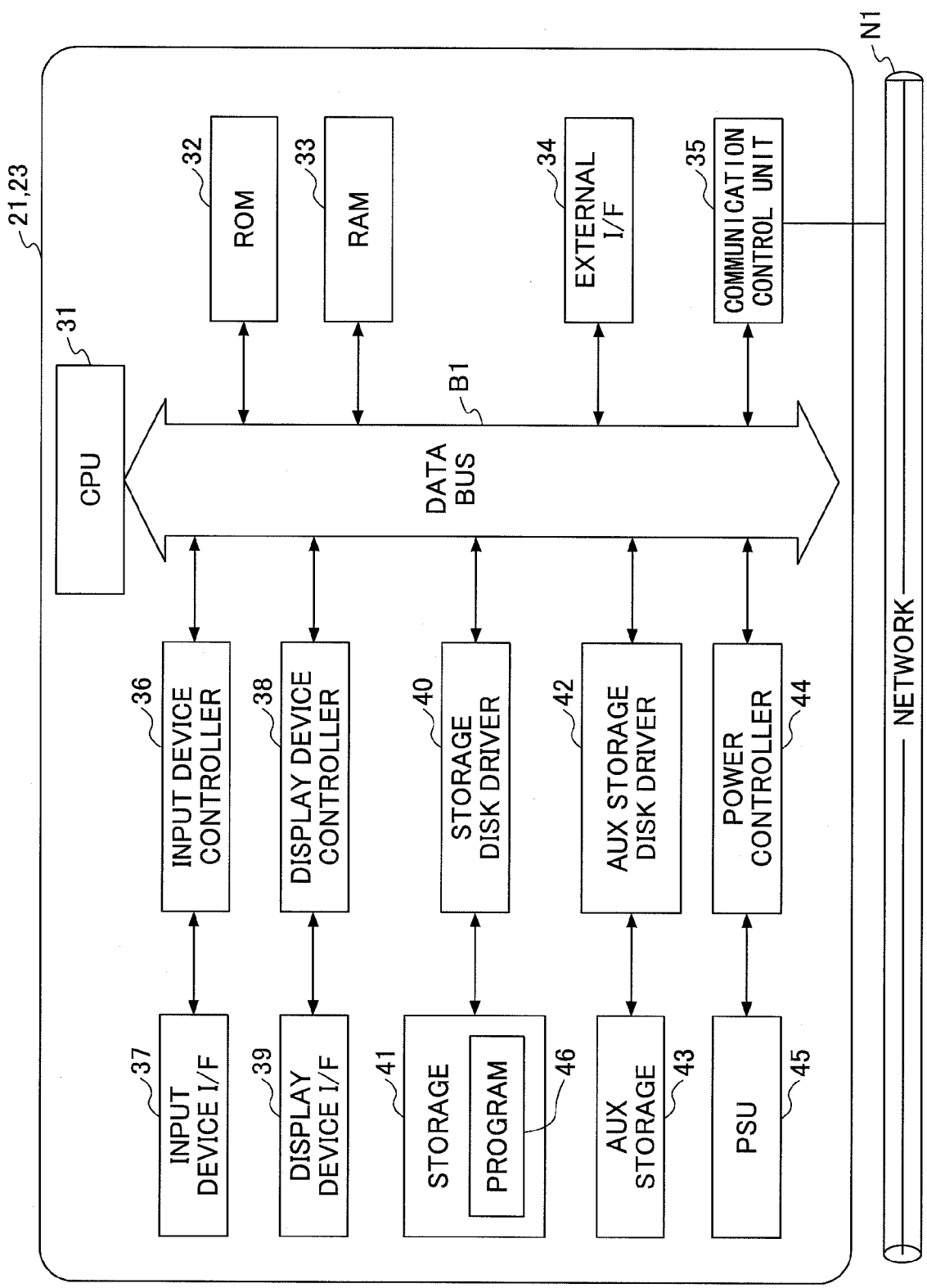
FIG. 3 is a block diagram illustrating an example of a hardware structure of a server.

FIG. 3 is a block diagram illustrating an example of a hardware structure of the server. Because the hardware structures of the servers 21 and 23 are the same, FIG. 3 may also be regarded as the hardware structure of the cloud service information collecting device 23.

The server 21 or 23 illustrated in FIG. 3 includes a CPU (Central Processing Unit) 31, a ROM (Read Only Memory) 32, a RAM (Random Access Memory) 33, an external interface (I/F) 34, a communication control unit 35, an input device controller 36, a display device controller 38, a storage disk driver 40, an auxiliary storage disk driver 42, and a power controller 44 that are connected via a data bus B1. An input device interface (I/F) 37 is connected to the input device controller 36, and a display device interface (I/F) 39 is connected to the display device controller 38. A storage 41 is connected to the storage disk driver 40, and an auxiliary storage 42 is connected to the auxiliary storage disk driver 42. A PSU (Power Supply Unit) 45 is connected to the power controller 44.

The CPU 31 controls the entire server 21 or 23, and other constituent elements (or devices) of the server 21 or 23 are under the control of the CPU 31. The ROM 32 stores program codes and other static data. The RAM 33 is used as a temporary storage location for data and one or more programs 46 when the CPU 31 executes the one or more programs 46.

The external I/F 34 enables communication between the server 21 or 23 and an external device using an interface such as a Centronics interface or a USB (Universal Serial Bus). The communication control unit 35 connects to a network N1, such as the Ethernet (registered trademark), using a cable or a wireless connection, in order to enable communication between the server 21 or 23 and an external device.

The input device controller 36 and the input device I/F 37 provide an interface for accepting operations from the user, when a keyboard, a mouse or the like is connected to the input device I/F 37. The display device controller 38 and the display device I/F 39 provide an interface for providing (that is, displaying) visual information to the user when a display or the like is connected to the display device I/F 39.

The storage disk driver 40 and the storage 41 form a non-volatile memory (or HDD (Hard Disk Drive)) for use in storing a large amount of data and registering one or more databases. The storage 41 may store the one or more programs 46. The program 46 may be downloaded from a server (not illustrated) and installed in the server 21 or 23. Alternatively, the program 46 may be distributed in a state stored in the auxiliary storage 43.

The auxiliary storage disk driver 42 and the auxiliary storage 43 form an interface with respect to a portable recording medium (or storage medium), in order to read external data from a DVD (Digital Versatile Disk) or the like and to store data as backup.

The power controller 44 and the PSU 45 convert power received from an external power supply (not illustrated), and supply the converted power to the constituent elements (or devices) within the server 21 or 23. The data bus B1 enables communication between the devices within the server 21 or 23, and between the CPU 31 and the devices within the server 21 or 23.

Figure 4:
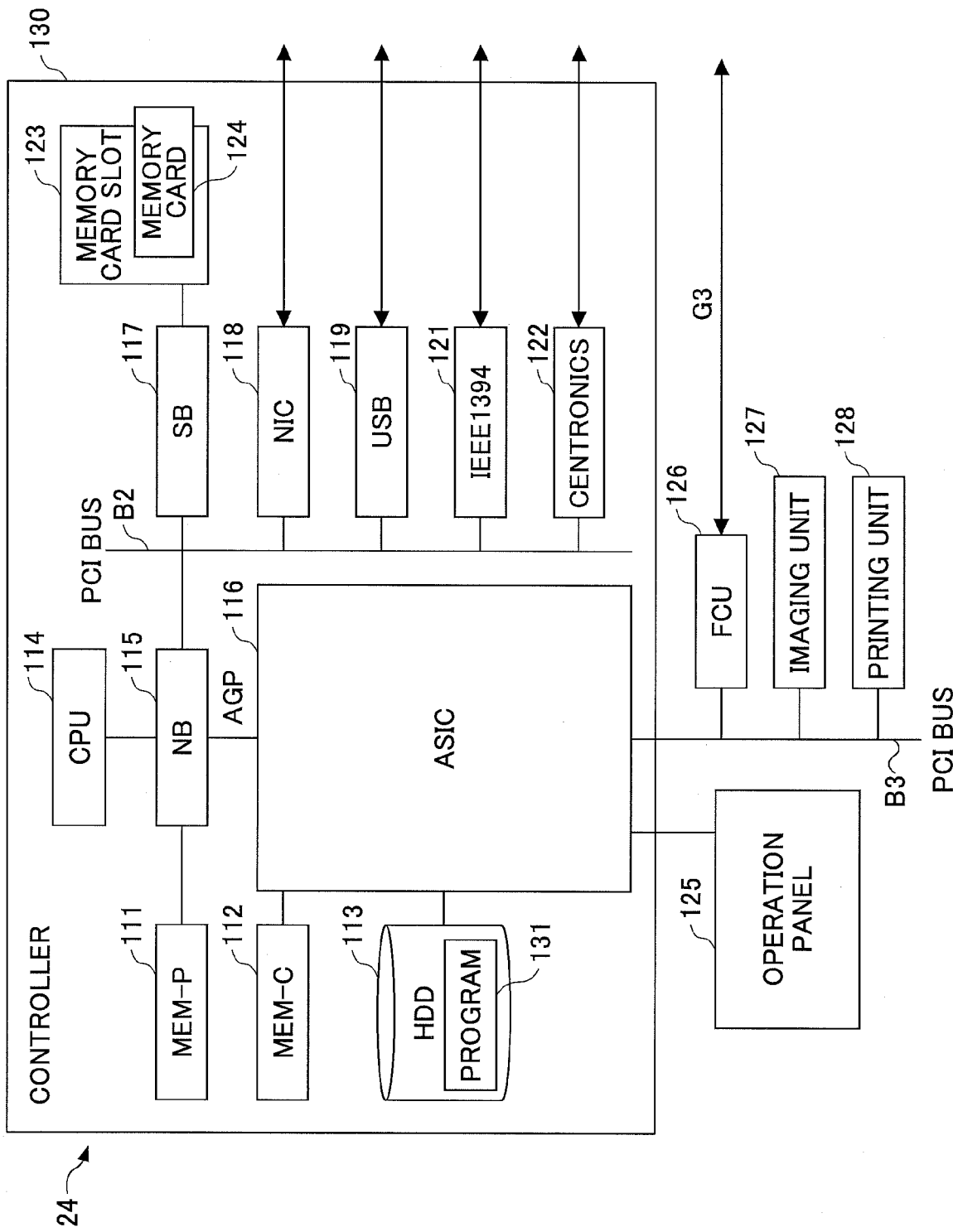
FIG. 4 is a block diagram illustrating an example of a hardware structure of a device.

FIG. 4 is a block diagram illustrating an example of a hardware structure of a device. In this example, the device 24 illustrated in FIG. 4 is formed by a MFP (Multi-Function Peripheral) that includes a print function, a scanner function, a facsimile function, and a copy function. However, the device 24 may be formed by a PC (Personal Computer) or the like forming the device 22.

The device 24 illustrated in FIG. 4 includes a controller 130, an operation panel 125, a FCU (Facsimile Control Unit) 126, an imaging unit 127, and a printing unit 128.

The controller 130 includes a CPU 114, an ASIC (Application Specific Integrated Circuit) 116, a NB (North Bridge) 115, a SB (South Bridge) 117, a system memory (hereinafter referred to as a MEM-P) 111, a local memory (hereinafter referred to as a MEM-C) 112, a HDD 113, a memory card slot 123, a NIC (Network Interface Controller) 118, a USB device 119, an IEEE1394 device 121, and a Centronics device 122.

The CPU 114 may perform various information processing by executing application software, platform, and option package in parallel in units of processes by an OS (Operating System) such as the UNIX (registered trademark) OS. The ASIC 116 forms an IC for image processing. The NB 115 connects the CPU 114 and the ASIC 116, and the SB 117 connects the NB 115 and a peripheral device or the like. The ASIC 116 and the NB 115 are connected via an AGP (Accelerated Graphics Port).

The MEM-P 111 is connected to the NB 115, and the MEM-C 112 is connected to the ASIC 116. The HDD 113 provides a storage connected to the ASIC 116 in order to store image data, document data, programs, font data, and the like. The HDD 113 may store the various application software described above, and one or more programs 131.

The memory card slot 123 is connected to the SB 117, and a memory card 124 is inserted into and set in the memory card slot 123. The memory card 114 may be formed by a flash memory, such as a USB memory, and store the one or more programs 131. The program 131 may be downloaded to the device 24 from a server (not illustrated) and distributed.

The NIC 118 is used to make a data communication via the network using a MAC (Media Access Control) address or the like. The USB device 119 provides a serial port in conformance with the USB standards. The IEEE1394 device 121 provides a serial port in conformance with the IEEE1394 standards. The Centronics device 122 provides a parallel port in conformance with the Centronics specifications. The NIC 118, the USB device 119, the IEEE1394 device 121, and the Centronics device 122 are connected via a PCI (Peripheral Component Interconnect) bus B2 to the NB 115 and the SB 117.

The operation panel 125 forms a hardware (operating part) for use by the user to make inputs to the device 24, and also forms a hardware (display part) to provide visual information from the device 24 with respect to the user. The operation panel 125 is connected to the ASIC 116. The FCU 126, the imaging unit 127, and the printing unit 128 are connected via a PCI bus B3 to the ASIC 116.

Figure 5:
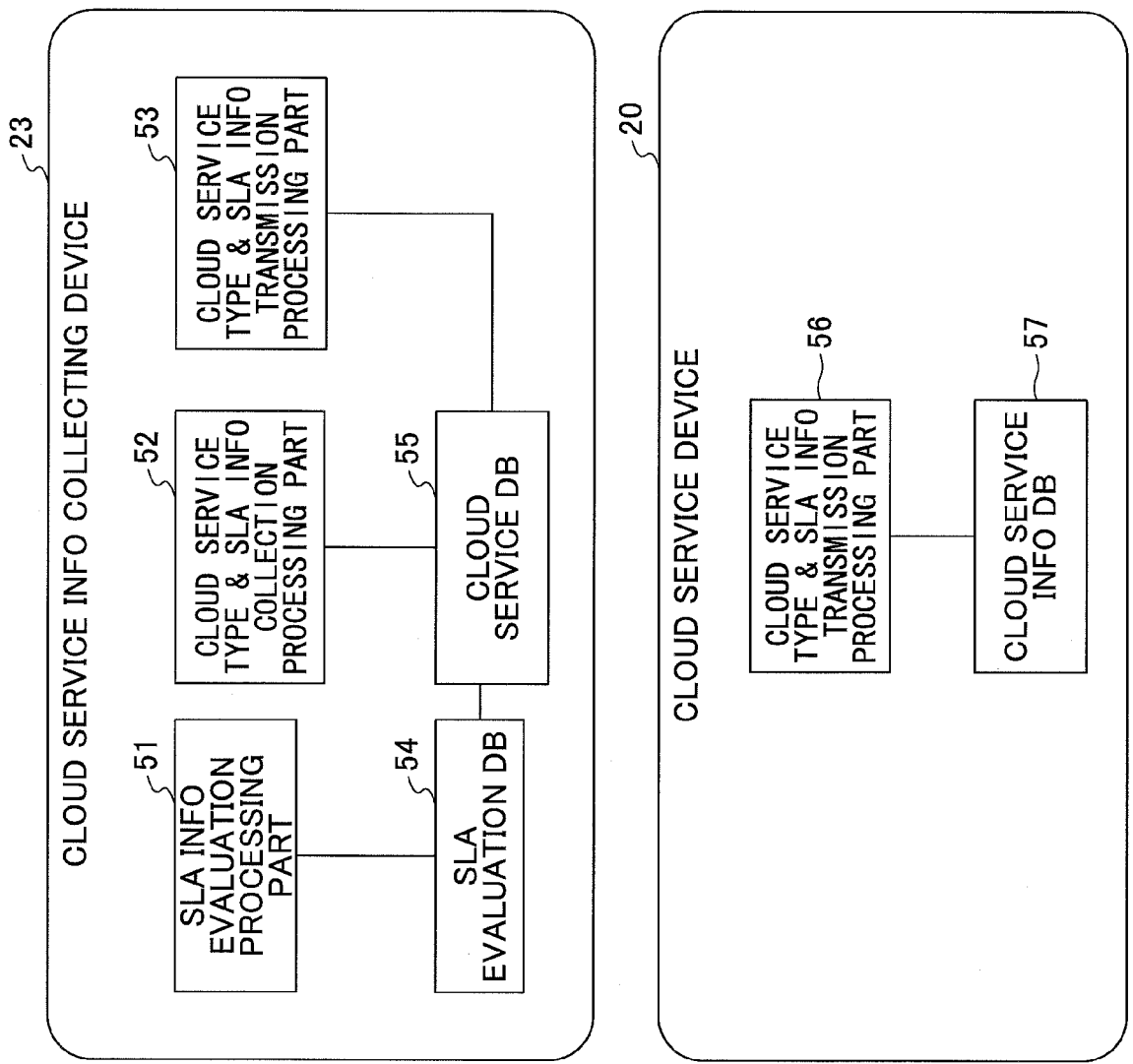
FIG. 5 is a block diagram illustrating an example of a functional structure of a cloud service information collecting device and a cloud service device.

FIG. 5 is a block diagram illustrating an example of a functional structure of a cloud service information collecting device and a cloud service device. FIG. 5 illustrates the functional structure of the cloud service information collecting device 23 in an upper portion thereof, and illustrates the functional structure of the cloud service device 20 that provides the SLA information in a lower portion thereof.

The cloud service information collecting device 23 illustrated in FIG. 5 includes a SLA information evaluation processing part 51, a cloud service type and SLA information collection processing part 52, a cloud service type and SLA information transmission processing part 53, a SLA evaluation database (DB) 54, and a cloud service database (DB) 55.

The SLA information evaluation processing part 51 converts the collected SLA information to scores (or points) in order to evaluate the SLA information. The cloud service type and SLA information collection processing part 52 collects the usable services and the SLA information. The cloud service type and SLA information transmission processing part 53 transmits the usable services and the SLA information depending on an external providing request for the usable services and the SLA information.

The SLA evaluation DB 54 stores the SLA information of each cloud service device 20 and the information obtained by converting the SLA information into scores (or points). The cloud service DB 55 stores the address of each cloud service device 20 and the usable services provided thereby. In the following description, the information obtained by converting the SLA information into stores (or points) may be referred to as the SLA information, or vice versa, because the two information are essentially the same.

The cloud service equipment 20 illustrated in FIG. 5, that provides the SLA information, includes a cloud service type and SLA information transmission processing part 53 and a cloud service information database (DB) 57.

The cloud service type and SLA information transmission processing part 53 transmits the usable services that may be provided by the cloud service device 20 depending on a request from the cloud service information collecting device 23, and the SLA information that is an index objectively indicating the service level of the cloud service device 20. The cloud service information DB 57 stores the usable services and the SLA information.

Figure 6:
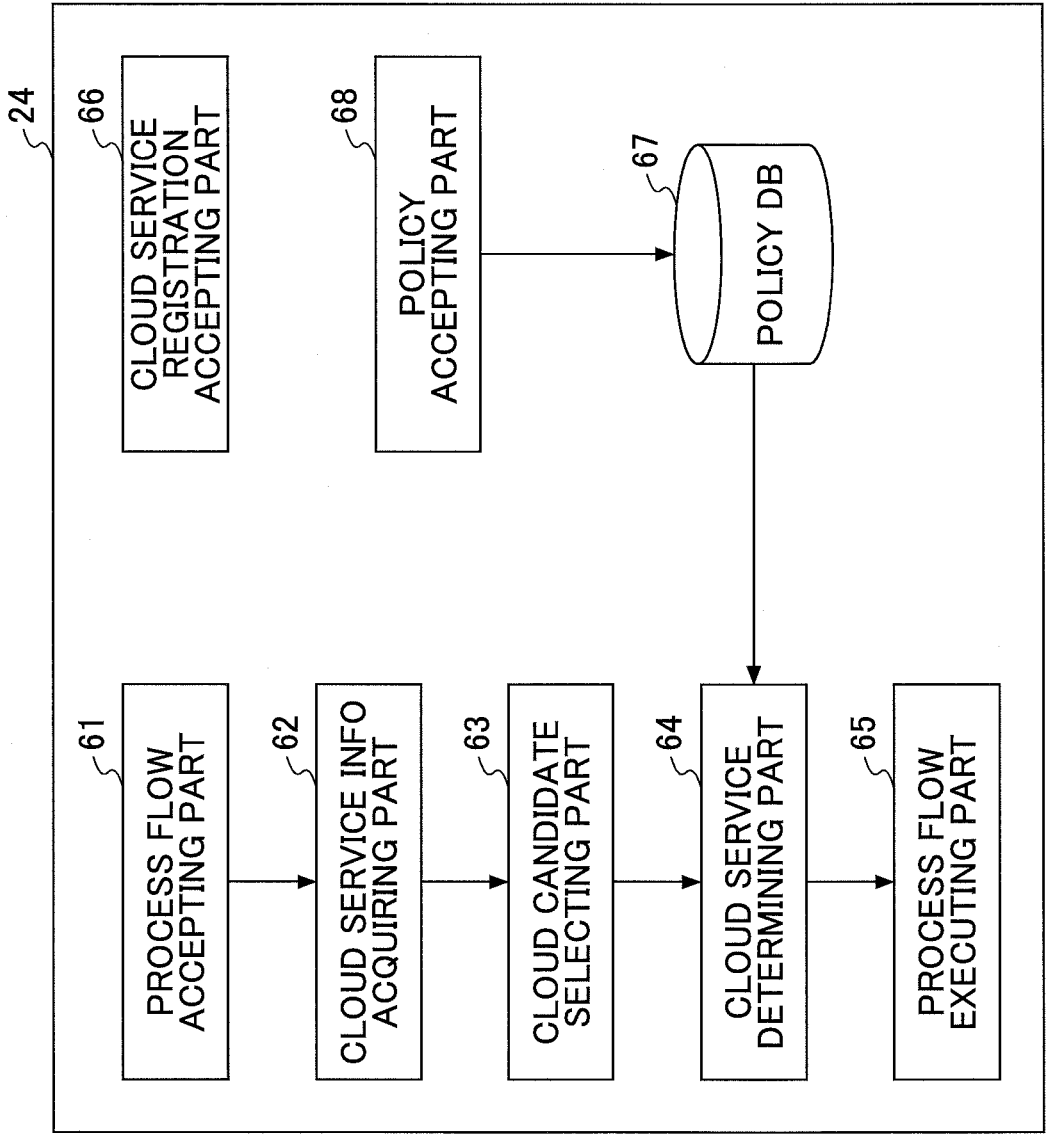
FIG. 6 is a block diagram illustrating an example of a functional structure of the device.

FIG. 6 is a block diagram illustrating an example of a functional structure of the device. The device 24 illustrated in FIG. 6 includes a process flow accepting part 61, a cloud service information acquiring part 62, a cloud candidate selecting part 63, a cloud service determining part 64, a process flow executing part 65, a cloud service registration accepting part 66, a policy accepting part 68, and a policy database (DB) 67. The policy DB 67 stores the user policy, and may be formed by the HDD 133 of the device 24, for example.

The process flow accepting part 61 accepts a setting of the process flow selected by the user. The cloud service information acquiring part 62 acquires the usable services and the SLA information from the cloud service information collecting device 23. The cloud candidate selecting part 63 selects candidate combinations of the cloud service devices 20 that may provide the services, based on each process and the usable services included in the process flow. The cloud service determining part 64 calculates an average of total scores (or points) and an average of type scores (or points) with respect to the candidate combinations of the cloud service devices 20 using the SLA information, and determines the combination of the cloud service devices 20 matching the user policy from the candidate combinations of the cloud service devices 20, based on the calculated averages (that is, calculation results) and the user policy stored in the policy DB 67.

The process flow executing part 65 executes the process flow based on the determined combination of the cloud service devices 20. The manager may individually set in the cloud service registration accepting part 66 the cloud service information device 20 from which the cloud service information collecting device 23 cannot collect the usable services and the SLA information. The cloud service registration accepting part 66 sends the cloud service device 20 set therein by the manager to the cloud service collecting device 23, and thus, the user may thereafter use the registered cloud service device 20 in a manner similar to the other cloud service devices 20. The policy accepting part 68 accepts the user policy set by the user, and registers the accepted user policy in the policy DB 67.

[Service Providing Method]

Figure 7:
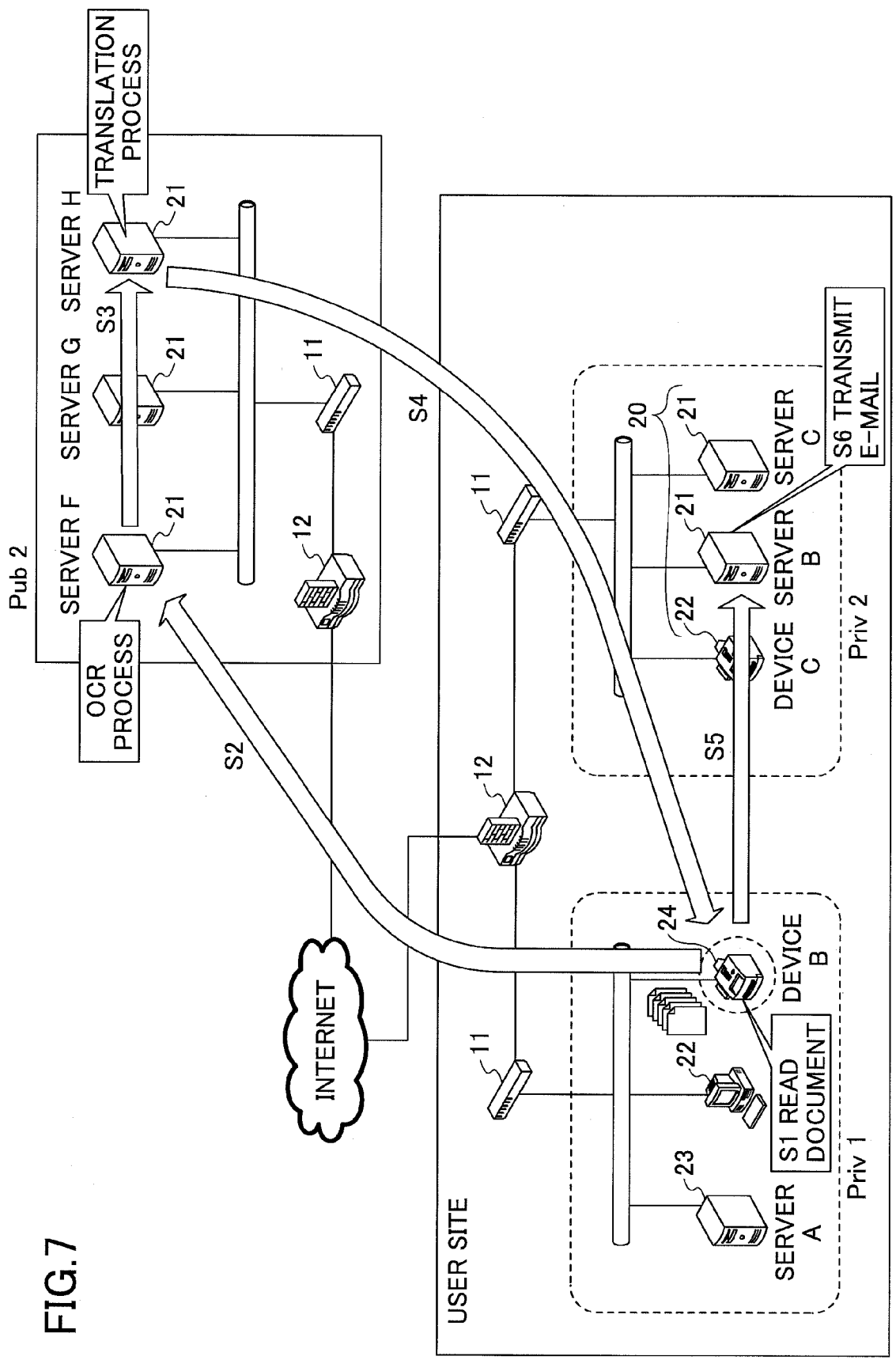
FIG. 7 is a diagram for explaining how cloud service devices interact to realize a process flow of a user in a cloud computing environment.

FIG. 7 is a diagram for explaining how cloud service devices interact to realize the process flow of the user in a cloud computing environment. In FIG. 7, those parts that are the same as those corresponding parts in FIG. 2 are designated by the same reference numerals, and a description thereof will be omitted. The affixes "A", "B", "C" and "D" to the reference numerals "11" and "12" and the illustration of the public cloud pub1 are omitted in FIG. 7. The servers 21 and 23 and the devices 22 and 24 are assigned alphabetical names "A", "B", "C", "F", "G", and "H" for the sake of convenience. The user operates the device (device B), and the server 23 (device A) forms the cloud service information collecting device 23.

It is assumed for the sake of convenience that the contents of the processes represented by the process flow that is input by the user by operating the device B include performing an OCR (Optical Character Recognition) process on the document that is read, performing a translation process to translate Japanese into English, and performing an e-mail sending process to send an e-mail.

With respect to this process flow, the device B may determine a combination of the cloud service devices 20 to perform the OCR process by the server F, the translation process by the server H, and the e-mail sending process by the server B. Hence, the following steps S1 through S6 are performed by the process flow.

In a step S1, the user causes the device B to read the document of the user by the scanner of the device B, in order to obtain image data of the read document.

In a step S2, the device B sends the image data of the read document with respect to the cloud service device (server F) that is capable of performing the OCR process.

In a step S3, the server F performs the OCR process on the received image data of the read document, in order to obtain Japanese text data of the read document, and sends the Japanese text data of the read document with respect to the cloud service device (server H) that is capable of performing the translation process on the Japanese text data.

In a step S4, the server H performs the translation process on the received Japanese text data, in order to obtain a translated English text data, and returns the English text data to the device B.

In a step S5, the device B sends the received English text data to the cloud service device (server B) that is capable of sending the e-mail.

In a step S6, the server B performs the e-mail sending process to send the received English text data by e-mail.

[Collecting Usable Services & SLA Information]

Figure 8:
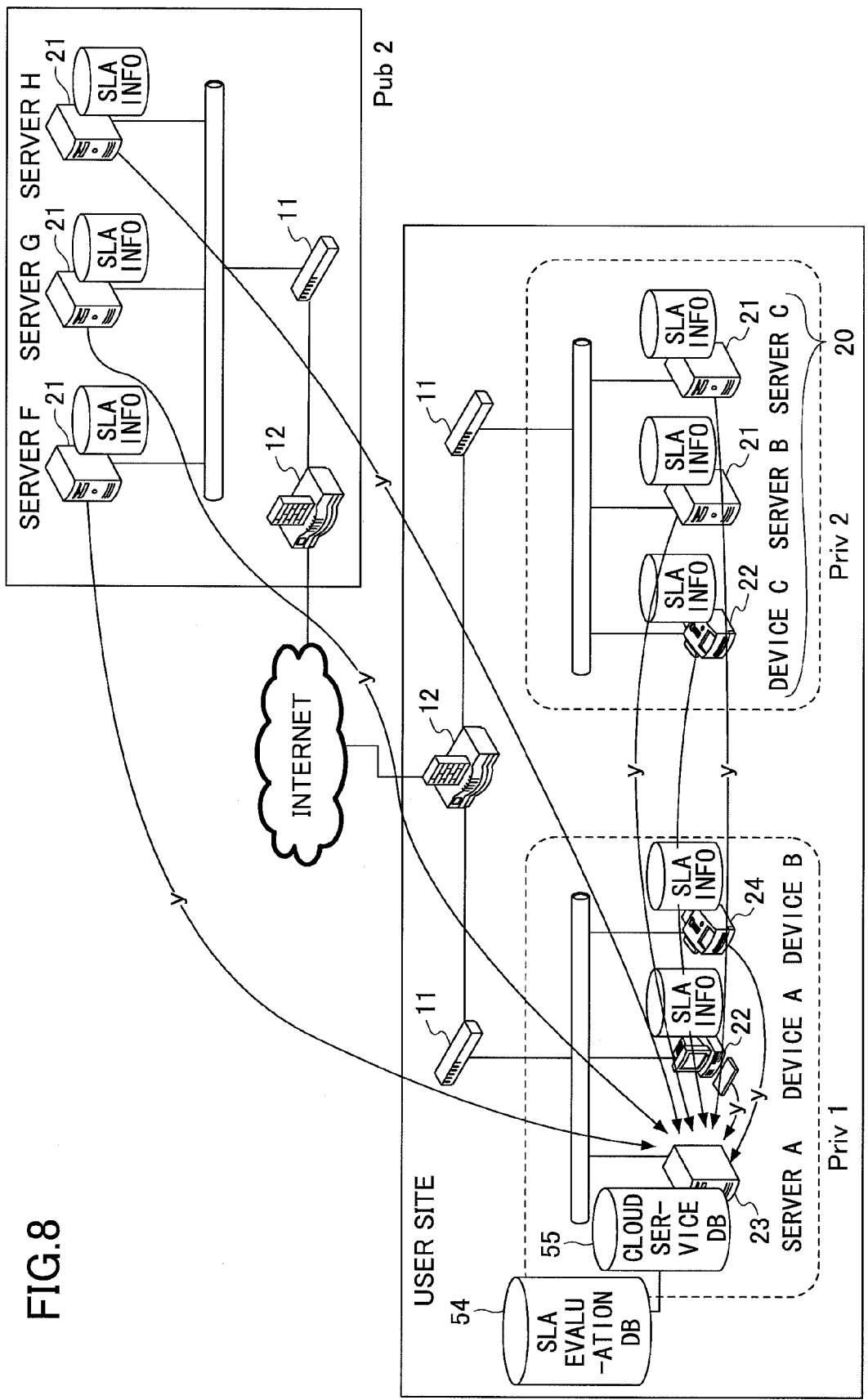
FIG. 8 is a diagram for explaining collection of usable services and SLA information.

FIG. 8 is a diagram for explaining collection of usable services and SLA information. As described above, it is assumed for the sake of convenience that the server A forms the cloud service information collecting device 23, and the other servers 21 and devices 22 form the cloud service devices 20. In FIG. 8, those parts that are the same as those corresponding parts in FIG. 7 are designated by the same reference numerals, and a description thereof will be omitted.

In FIG. 8, it is assumed for the sake of convenience that one cloud service information collecting device 23 exists within the private cloud (segment) priv1. However, the location of the device that having the role of the cloud service information collecting device 23 is not limited, as long as an access thereto is possible via the network. For example, the device having the role of the cloud service information collecting device 23 may be located within the entire user site or, on the Internet.

The cloud service information collecting device 23 retains the cloud service DB 55 that registers the cloud service devices 20 that may be found on the network and the usable services. In addition, the cloud service information collecting device 23 retains the SLA evaluation DB 54 that registers the SLA information of each cloud service. Although the cloud service DB 55 and the SLA evaluation DB 54 are illustrated as two separate DBs, the contents of the cloud service DB 55 and the SLA evaluation DB 54 may of course be registered within a single DB.

Each of the cloud service devices (devices A, B and C, servers B, C, F, G and H in FIG. 8) 20 that provide the cloud services retains the SLA information that is the index objectively indicating the service level of the cloud service device 20. Each of these cloud service devices 20 may lay open to public the SLA information retained therein in response to an external inquiry.

The cloud service type and SLA information collection processing part 52 of the cloud service information collecting device 23 searches the entire network accessible therefrom (access from the user site within a company is restricted in many cases for security reasons) and a particular network range input beforehand by the manager of the cloud service information collecting device 23, in order to find the cloud service device 20. For example, an inquiry is made to inquire whether the usable services and the SLA information are laid open to public in a broadcast manner.

The cloud service type and SLA information collection processing part 52 requests the services (services in units of processes such as the OCR process, the translation process and the e-mail sending process described above) that may be provided and the SLA information, with respect to the cloud service device 20 that is found as a result of the search.

The cloud service device 20 sends the usable services and the SLA information thereof to the cloud service information collecting device 23 in response to the request from the cloud service information collecting device 23. The cloud service information and SLA information collection processing part 52 of the cloud service information collecting device 23 stores the usable services received into the cloud service DB 55, and stores the SLA information received into the SLA evaluation DB 54. In addition, in order to enable quantitative evaluation (or comparison) later, the SLA information evaluation processing part 51 converts the SLA information into scores (or points) and stores the scores into the SLA evaluation DB 54. A description of a score (or point) conversion rule will be given later in the specification.

FIG. 9 is a diagram illustrating an example of a cloud service database. FIG. 9 schematically illustrates an example of the usable services stored in the cloud service DB 55. Fields of the cloud service DB 55 include "ID", "cloud service device name", "SLA information", and "usable service".

The "ID" is a serial number uniquely assigned to the usable service in the order responded, for example. The "cloud service device name" is identification information assigned to identify or specify each cloud service. Because the "cloud service device name" need only identify the cloud service, the IP address, FQDN (Fully Qualified Domain Name), and the like may be used therefor.

The "SLA information" is the index objectively indicating the service level of the cloud service device 20, and may be categorized into sub categories such as availability, reliability, performance and extensibility. The details of the SLA information will be described later in the specification. For example, "to SLA evaluation DB" indicated in the "SLA information" field indicates that a link is made to the SLA information of each cloud service device 20, however, the entity of the SLA information may be registered in the "SLA information" field.

The "usable service" indicates the type of usable service that is laid open to public via the network by each cloud service device 20. In the example illustrated in FIG. 9, the device A provides the file storage service, the device B provides the image read and print services, the device C provides the image read, facsimile transmission and facsimile reception services, the server B provides the mail transmission and mail reception services, the server C provides the OCR, the Internet facsimile transmission and the Internet facsimile reception services, the server F provides the OCR service, the server G provides the mail transmission and the mail reception services, and the server H provides the language translation service.

FIGS. 10A, 10B and 10C are diagrams illustrating an example of a SLA information database. FIGS. 10A, 10B and 10C schematically illustrate an example of the SLA information stored in the SLA evaluation DB 54 in three parts for the sake of convenience. Fields of the SLA evaluation DB 54 include "type", "service level item", "prescribed content", "unit", "set value", "item score (or point)", and "type score (or point)". The "prescribed content" and "unit" fields are indicated to facilitate the description of the SLA information, and a description of these fields are actually unnecessary.

The "type" and "service level item" fields indicate examples for a typical service level of the SLA. In other words, the "type" of the service level indicates the availability illustrated in FIG. 10A, the reliability illustrated in FIG. 10B, and the performance and the extensibility illustrated in FIG. 10C. Further, the "service level item" of each type of service level indicates the following.

Availability: Service time, planned stop schedule notification, service utilization rate, disaster recovery, substitute means at time of serious fault, data format provided by substitute means, and upgrade policy.

Reliability: Average recovery time, system monitoring standard, fault notification process, fault notification time, fault monitoring interval, reporting method/interval for service providing status, and log acquisition.

Performance: Online response time, and batch processing time.

Extensibility: Customizability, external extensibility, and number of simultaneously connected users.

When the cloud service type and SLA information collection processing part 52 of the cloud service information collecting device 23 makes a request for the SLA information to the cloud service device 20, the cloud service type and SLA information transmission processing part 53 of the cloud service device 20 transmits the SLA information that is laid open to public in a XML (eXtensible Markup Language) data format, for example. The information transmitted by the cloud service device 20 includes the "set value" corresponding to the "service level item" illustrated in FIG. 10 or, only the "set value", for example. The "set value" may be a character string data or, data having other suitable data formats identifiable by software.

The "set value" registers a numerical value representing the degree of the service level for each "service level item", the existence (or non-existence) of the service, the service contents, and the like. The contents of the "set value" are converted into the numerical values (scores or points) of the item score.

For example, in a case in which information that is not used by the cloud service information collecting device 23 is included in the SLA information, the cloud service type and SLA information collection processing part 52 may discard this information and register this information in the SLA information. In addition, in a case in which the service level item to be collected by the cloud service information collecting device 23 is not included in the SLA information, the cloud service type and SLA information collection processing part 52 may register an invalid value to the service level item.

The SLA information evaluation processing part 51 of the cloud service information collecting device 23 that receives the "set value" of the "service level item" analyzes the contents of each "set value", and converts the "set value" into a score of 0 to 5 points based on the evaluation rule which will be described later in the specification. The score is registered in the "item score" of the SLA evaluation DB 54 in correspondence with the "set value", as illustrated in FIGS. 10A through 10C.

In addition, the SLA information evaluation processing part 51 totals the scores of the "item score" for each "type" and registers the total in the "type score". Further, the sum total of all of the scores is registered in the "total score" at the bottom of FIG. 10C. In FIGS. 10A through 10C, the scores of the "item score" are simply totaled for each "type", however, the "type score" may be totaled by weighting each "service level item".

[Evaluation]

The SLA information evaluation processing part 51 converts the SLA information into the score based on the evaluation rule. FIGS. 11A and 11B are diagrams illustrating an example of the evaluation rule to evaluate SLA information and convert evaluation results into evaluation scores in two parts for the sake of convenience. The evaluation rule is prestored in the storage 41 or the auxiliary storage 43 by the cloud service information collecting device 23.

The evaluation rule defines the correspondence between the contents of the "set value" of the SLA information and the evaluation score for each "service level item". For example, 5 points is the evaluation score for the "set value" of the "service level item" having the "service time" of "24 hours for 365 days", 4 points is the evaluation score for the "set value" of the "service level item" having "stopped time of 24 hours or less in 1 year", and 3 points to 0 point is the evaluation score for the "set value" of the "service level item" having the stopped time of 24 hours or longer in 1 year with the number of points decreasing with increasing stopped time.

The "service time" of "24 hours for 365 days" means that the system is not stopped for maintenance or the like in 1 year. In addition, when the "set value" is "23 hours 57 minutes for 365 days" means that the system is stopped for maintenance or the like for 3 minutes or less every day for 1 year, and the evaluation score for this case is 4 points.

The number of points of the evaluation score for other service level items may be set to be larger for higher service levels in a manner similar to the above.

For example, 5 points is the evaluation score for the "set value" of the "service utilization rate" having the utilization rate (%) of "99.9% or higher", and 4 points to 0 point is the evaluation score for the "set value" of the "service utilization rate" having the utilization rate of 99.8% or less with the number of points decreasing with decreasing utilization rate.

On the other hand, 5 points is the evaluation score for the "disaster recovery", "substitute means at time of serious fault", "upgrade policy", and "system monitoring standard" when the "set value" is "yes". The evaluation score is 0 point when the "set value" for the "disaster recovery", "substitute means at time of serious fault", "upgrade policy", and "system monitoring standard" is "no" or "unknown".

In addition, 5 points is the evaluation score for the "average recovery time" that is required on an average for the recovery when the "set value" is "15 minutes or less", and 4 points to 0 point is the evaluation score for the "set value" of the "average recovery time" having the average recovery time of more than 15 minutes with the number of points decreasing with increasing average recovery time.

Moreover, 5 points is the evaluation score for the "fault notification time" that is required to notify the fault when the "set value" is "5 minutes or less", and 4 points to 0 point is the evaluation score for the "set value" of the "fault notification time" having the notification time of more than 15 minutes with the number of points decreasing with increasing notification time.

Furthermore, 5 points is the evaluation score for the "fault monitoring interval" indicating the time interval at which the fault is monitored when the "set value" is "1 minute or less", and 4 points to 0 point is the evaluation score for the "set value" of the "fault monitoring interval" having the monitoring interval of more than 1 minute with the number of points decreasing with increasing monitoring interval.

In addition, 5 points is the evaluation score for the "reporting method/interval for service providing status" that indicates a reporting interval of the service providing status when the "set value" is "once a day", and 4 points to 0 point is the evaluation score for the "set value" of the "reporting method/interval for service providing status" having the reporting interval of more than once a day with the number of points decreasing with increasing reporting interval.

The cloud service information collecting device 23 evaluates the set value of each service level item by score (that is, number of points), based on the evaluation rule described above. As a result of this evaluation, the score is registered in the "item score" illustrated in FIGS. 10A through 10C.

[User Policy]

Next, a description will be given of the user policy, by referring to FIG. 12. FIG. 12 is a diagram illustrating an example of a policy table that is set with information indicating how a cloud computing user wishes to perform a process using the cloud service device. FIG. 12 illustrates an example of the user policy that is stored in the policy DB 67 that is set with information indicating the cloud service devices 20 the user wishes to use in order to perform the process. The anticipated result for the process performed using the cloud computing differs for each user. Hence, the user policy may be settable for each user, in order to make the cloud service device 20 selectable according to a selecting standard desired by each user.

The "policy" in FIG. 12 is set with information indicating how the "item score" and the "type score" in the SLA evaluation DB 54 may be applied to the selection of the cloud service device 20. For example, a user AAA may set the user policy "priority on sum total score". This setting "priority on sum total score" may be useful to a user who wishes to combine the cloud service devices 20 that are comprehensively superior. According to this setting, the combination of the cloud service devices 20 in which the device B has the highest "sum total score" is selected with respect to the process flow input by the user AAA.

A user BBB may set the policy "priority on availability score". This setting "priority on availability score" may be useful to a user who wishes to place emphasis on a particular type (availability in this example). According to this setting, because the availability may be low even when the sum total score is high, the combination of the cloud service devices 20 in which the device B has the highest "availability score" and not the highest "sum total score" is selected with respect to the process flow input by the user BBB.

A user CCC may set the policy "condition specifying" in which the "condition" "the availability score is 45 points or higher, the reliability score is 28 points or higher, and inquire for other conditions" is set. This setting "condition specifying" may be useful to a user who wishes to specify the details of the selecting standard for the cloud service devices 20. According to this setting, the combination of the cloud service devices 20 in which the availability score is 34 points or higher and the reliability score is 28 points or higher is selected with respect to the process flow input by the user CCC. Because the information "inquire for other conditions" is also set in the policy, the device B inquires the user CCC of the subsequent instructions when there is no combination of the cloud service devices 20 that matches (or satisfies) the condition.

Similarly, a user DDD may set the policy "condition specifying", but in this example, the information "interrupt process for other conditions" is also set. Hence, according to this user policy that is set, the device B interrupts the process when there is no combination of the cloud service devices 20 that matches the condition.

The user policy illustrated in FIG. 12 may be stored in each device 22 or, may be centrally managed by a predetermined server, such as the cloud service information collecting device 23, as user information within the same network. In the latter case, the device 22 that is started may download the user policy from the cloud service information collecting device 23 for use in selecting the cloud service devices.

Figure 13:
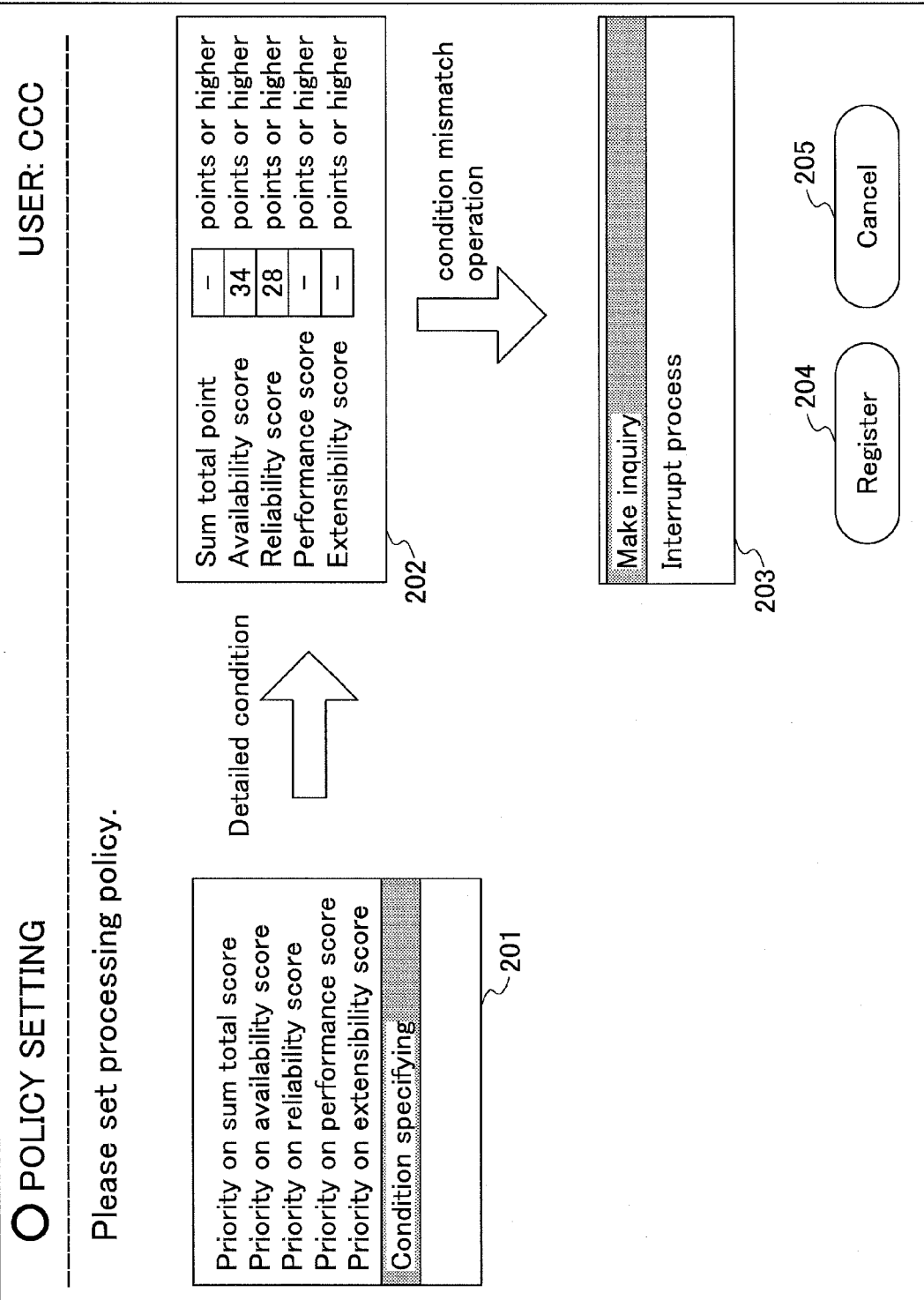
FIG. 13 is a diagram illustrating an example of a user policy setting or modifying screen.

FIG. 13 is a diagram illustrating an example of a user policy setting or modifying screen. The user may operate the device 22 in order to display the screen illustrated in FIG. 13 on the operation panel 125. Alternatively, the user may operate a PC that is connected to the device 22 in order to display the screen illustrated in FIG. 13.

The user may select one of "priority on sum total score", "priority on availability score", "priority on reliability score", "priority on performance score", "priority on extensibility score", and "condition specifying" that are displayed within a policy selecting box 201 illustrated in FIG. 12.

When the user selects the "condition specifying", a detailed condition box 202 is displayed on the right of the policy selecting box 201 to enable the user to set a lower limit value of the score for each type of the service level. The lower limit value of the score (that is, number of points) may be set using hardware keys (not illustrated) or the like. In this example, "34" is set as the lower limit value for the availability score, and "28" is set as the lower limit value for the reliability score. The scores in the detailed condition box 201 are set in the "condition" of the user policy.

On the other hand, when the user selects the "condition specifying" in the detailed condition box 201, a condition mismatch process box 203 is displayed on the lower right of the policy selecting box 201 to enable the user to set the process for the case in which there is no combination of the cloud service devices 20 matching the condition. In this example, the process "make inquiry" and "interrupt process" are selectable from the condition mismatch process box 203. The score in the condition mismatch process box 203 is set in the "condition" of the user policy.

The policy accepting part 68 of the device B accepts the user policy set by the user, and stores the user policy in the policy DB 67 in correspondence with the user name that uniquely identifies the user. The user name may be the user ID that is used by the user when making the log-in to the device B. The policy DB 67 may be retained in the server A or the like, and in such cases, the policy accepting part 68 acquires the user policy from the server A.

[Selecting Combination of Cloud Services]

Figure 14:
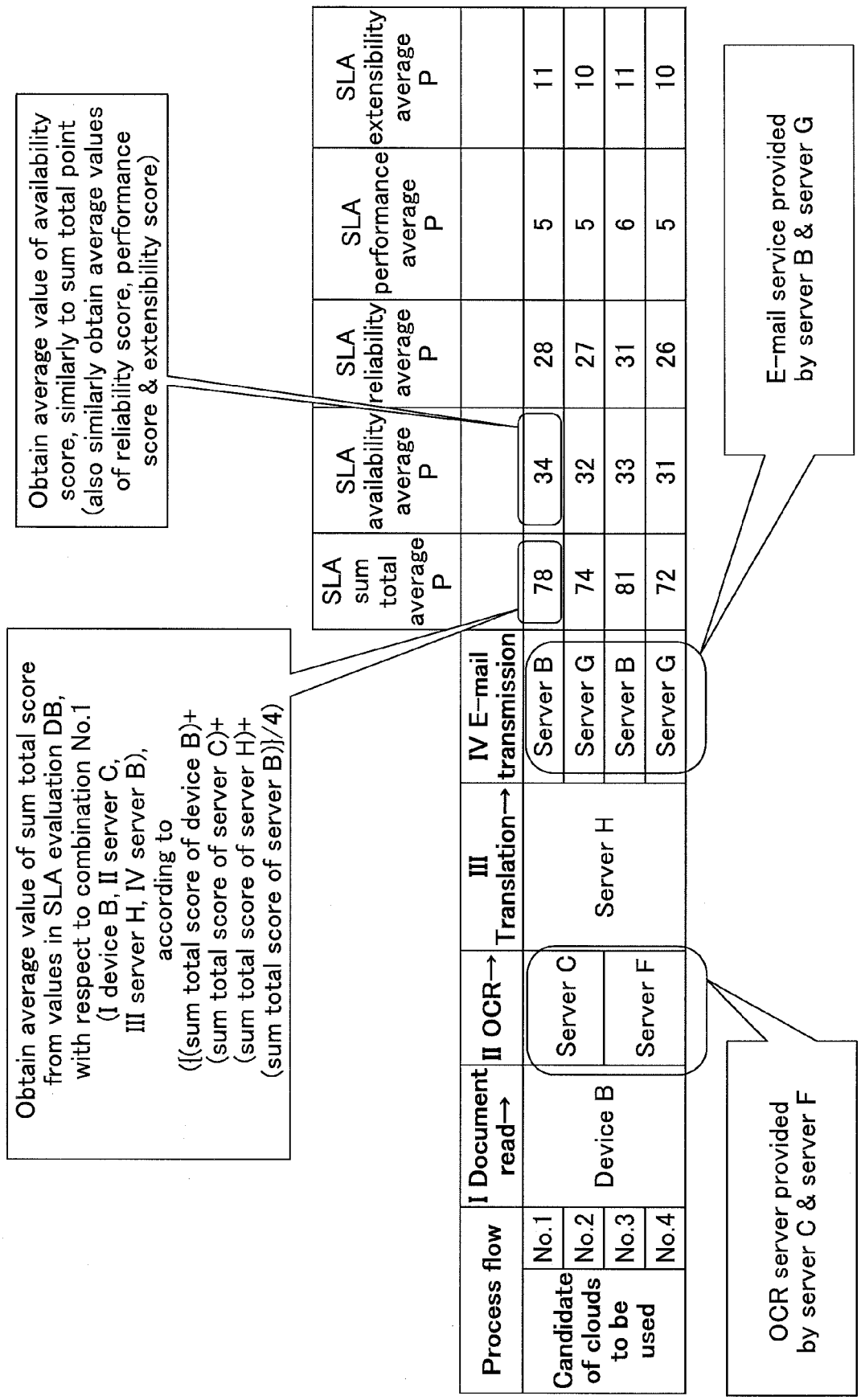
FIG. 14 is a diagram for explaining an example of a list of combinations of cloud services usable in the cloud computing environment and selection thereof.
Figure 15:
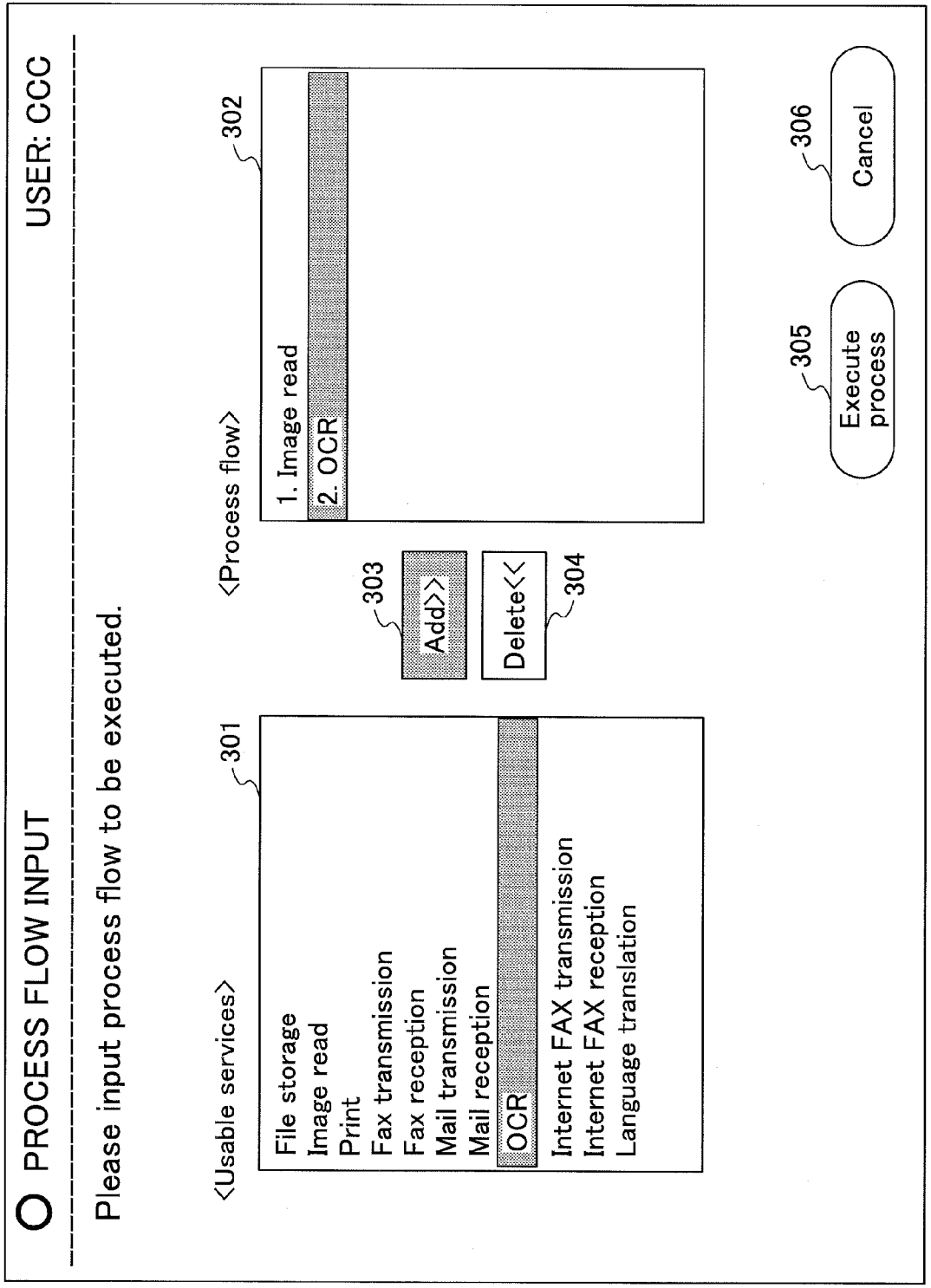
FIG. 15 is a diagram illustrating an example of a process flow input screen.

FIG. 14 is a diagram for explaining an example of a list of combinations of cloud services usable in the cloud computing environment and selection thereof. FIG. 15 is a diagram illustrating an example of a process flow input screen.

First, when the user wishes to use the cloud computing service, the user operates the device B in order to display the input screen illustrated in FIG. 15 on the operation panel 125. When operating the device B, the user is already logged in to the device B, and thus, the user name "CCC" is displayed on the top right of the input screen.

The input screen includes a usable service selection box 301 and a process flow box 302. The cloud service information acquiring part 62 of the device B acquires the usable services of the cloud service DB 55 from the cloud service information collecting device 23. Hence, the device B may display the usable services of the cloud service device 20 that is presently connected to the network.

The user selects the usable services from the usable service selection box 301 in the order of the process, and selects an "add" button 301. As a result, the usable services that are selected are displayed in the process flow box 302.

In this example, it is assumed for the sake of convenience that the user selects "I. Document read→II. OCR→III. Language translation→IV. E-mail transmission" as the process flow. When deleting the process which has been selected, the user may select the usable service to be deleted from the process flow box 302 and select a "delete" button 304.

When the user sets the process flow made up of a series of processes and selects a "execute process" button 305, the process flow accepting part 61 accepts the process flow. Hence, the cloud candidate selecting part 63 starts the selection of the combination of cloud service devices 20.

Figure 16:
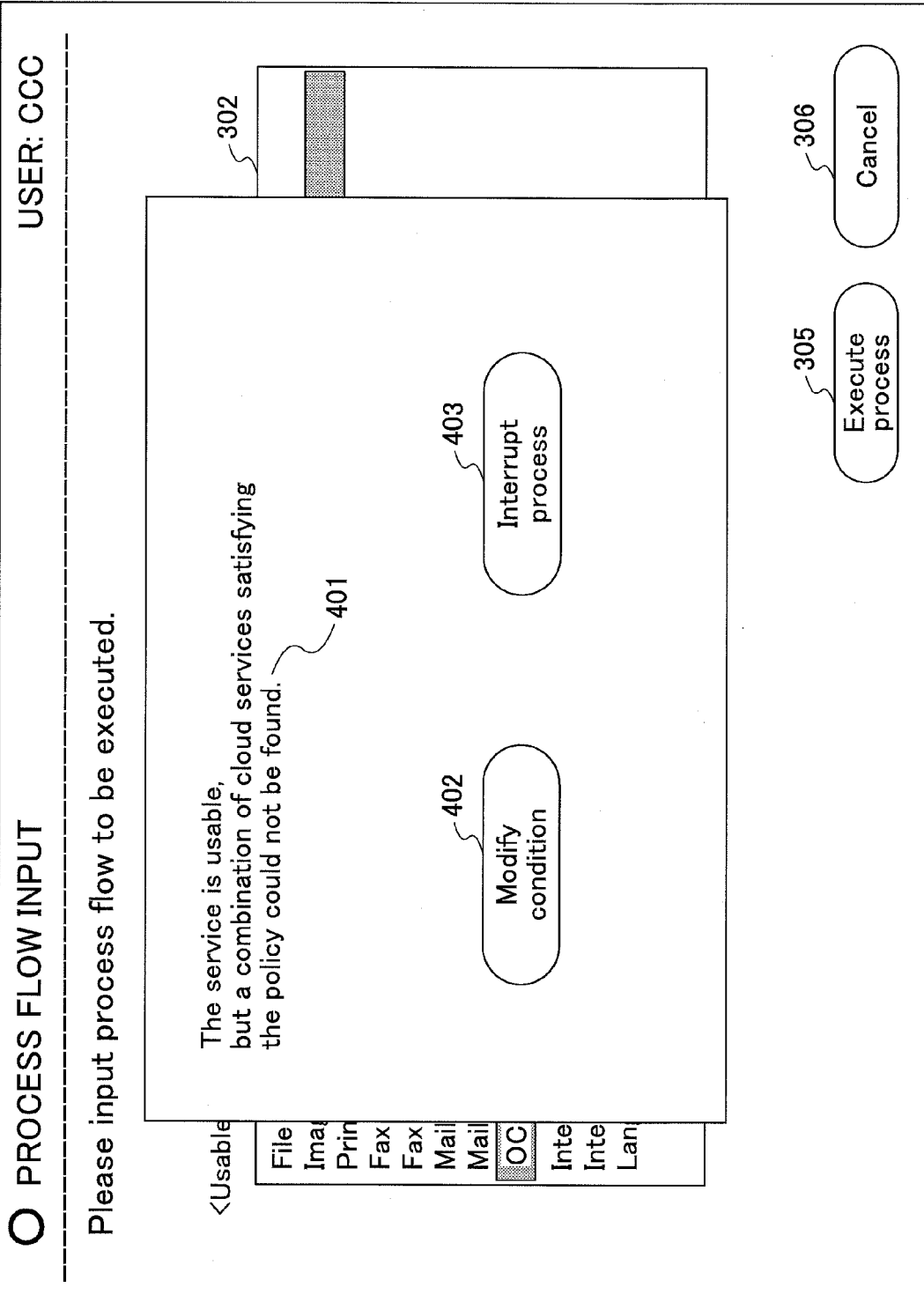
FIG. 16 is a diagram illustrating an example of a screen that is displayed on an operation panel when no cloud service combination is found.

FIG. 16 is a diagram illustrating an example of a screen that is displayed on the operation panel when no cloud service combination is found. FIG. 16 illustrates a case in which the device B displays a message 401 reading "The service is usable, but a combination of cloud services satisfying the policy could not be found.", for example, is displayed on the operation panel 125.

The device B displays on the screen a "modify condition" button 402 and an "interrupt process" button 403 as action candidates for the user. When the user selects the "modify condition" button 402, the device B displays the user policy setting or modifying screen illustrated in FIG. 13. Hence, the user CCC may modify the score for each type of the service level in the detailed condition box 202.

On the other hand, when the user selects the "interrupt process" button 403, the device B displays the process flow input screen illustrated in FIG. 15. Thus, the user CCC may perform an operation such as modifying the process flow.

The notification to the user is not limited to the display made on the operation panel 125, and the device B may make the notification to the user by sending an e-mail, for example. In addition, when the user operates a PC to use the cloud service devices 20, the cloud service information collecting device 23 may notify the user by sending the e-mail, for example.

Next, a description will be given of the selection of the combination of the cloud service devices 20 by the cloud candidate selecting part 63. When it is assumed for the sake of convenience that the device B acquires the usable services of the cloud service DB 55 identical to that illustrated in FIG. 9, the document read is possible at one location (device B), the OCR is possible at two locations (servers C and F), the language translation is possible at one location (server H), and the e-mail transmission is possible at two locations (servers B and G). As illustrated in FIG. 14, the cloud candidate selecting part 63 finally extracts the four candidates No. 1 through No. 4 of the combination of the cloud service devices 20 to be used from the combinations of the devices 22 and the servers 21 capable of realizing the process flow.

The cloud service determining part 64 may calculate the average score of the sum total score and the average score of each of the various kinds of scores from the SLA evaluation DB 54 with respect to the four candidates of the combinations. In the case of the sum total score for the candidate No. 1 of the combination, the average score of the sum total score may be calculated from ({(sum total score of device B)+(sum total score of server C)+(sum total score of server H)+(sum total score of server B)}/4). The average score for the other various kinds of scores may be calculated in a similar manner. Accordingly, the average score of the sum total scores and the average score of each of the various kinds of scores may be used as the average evaluation scores of each of the cloud service devices 20 included in the candidate of the combination of the cloud service devices 20, and higher service levels may be indicated by higher average scores.

The process load and the user wait (or standby) time may be reduced by calculating only the average of the sum total score or the average of the kind of score requested by the user policy, depending on the user policy of the who logged in. In addition, the calculation of the average includes calculating the total, and the higher the average the higher the total because the parameter is the same.

FIG. 17 is a diagram for explaining an example of a procedure in which a cloud service combination is selected from candidates of cloud service combinations according to a user policy.

The user policy of the user CCC is as set in the user policy illustrated in FIG. 12. According to this user policy, the availability score is 34 points or higher, the reliability score is 28 points or higher, and inquire for other conditions.

Amongst the candidates No.1 through No. 4 of the combination of the cloud service devices 20 to be used, the candidate No. 1 has the availability score that is 34 points or higher and the reliability score that is 28 points or higher. For this reason, the cloud service determining part 64 selects the candidate No. 1 as the combination matching the conditions set by the user CCC (that is, the user policy), from the candidates No. 1 through No. 4. Accordingly, the main entities that execute the above described process are I.device B→II.server C→III.server H→IV.server B.

When a plurality of candidates of the combination of the cloud service devices 20 match the user policy, the cloud service determining part 64 may select the candidate of the combination having the highest total for the average scores of the types specified by the user policy. For example, when the user policy of the user CCC specifies the availability score and the reliability score, the candidate of the combination having the highest total for the SLA availability average score and the SLA reliability average score may be selected.

The device B may determine the combination of the plurality of cloud service devices 20 in the order of the highest total for the average scores of the types specified by the user policy, and urge the user to make the final selection.

Next, a description will be given of a case in which the combination of the cloud service devices 20 is determined by the cloud service information collecting device 23 and not by the device B. In this case, the combination of the cloud service devices 20 may be determined according to the following steps or procedures.

(a) The process flow is set by the user CCC.
(b) The device B sends the process flow and the user policy to the cloud service information collecting device 23.
(c) The cloud service information collecting device 23 determines the candidates of the combination of the cloud service devices 20, based on the process flow and the usable services.
(d) The cloud service information collecting device 23 calculates the average of the sum total score or, the average of the scores of the type requested by the user policy, depending on the user policy, and determines the combination of the cloud service devices 20 having the highest average of the scores.
(e) The device B acquires the determined combination of the cloud service devices 20 from the cloud service information collecting device 23, and starts to execute the process flow.

Accordingly, this embodiment may perform the processes of the process flow, without having to select the devices, as long as the usable services, the process flow, the SLA information, and the user policy are acquired.

[Operation Procedure]

Figure 18:
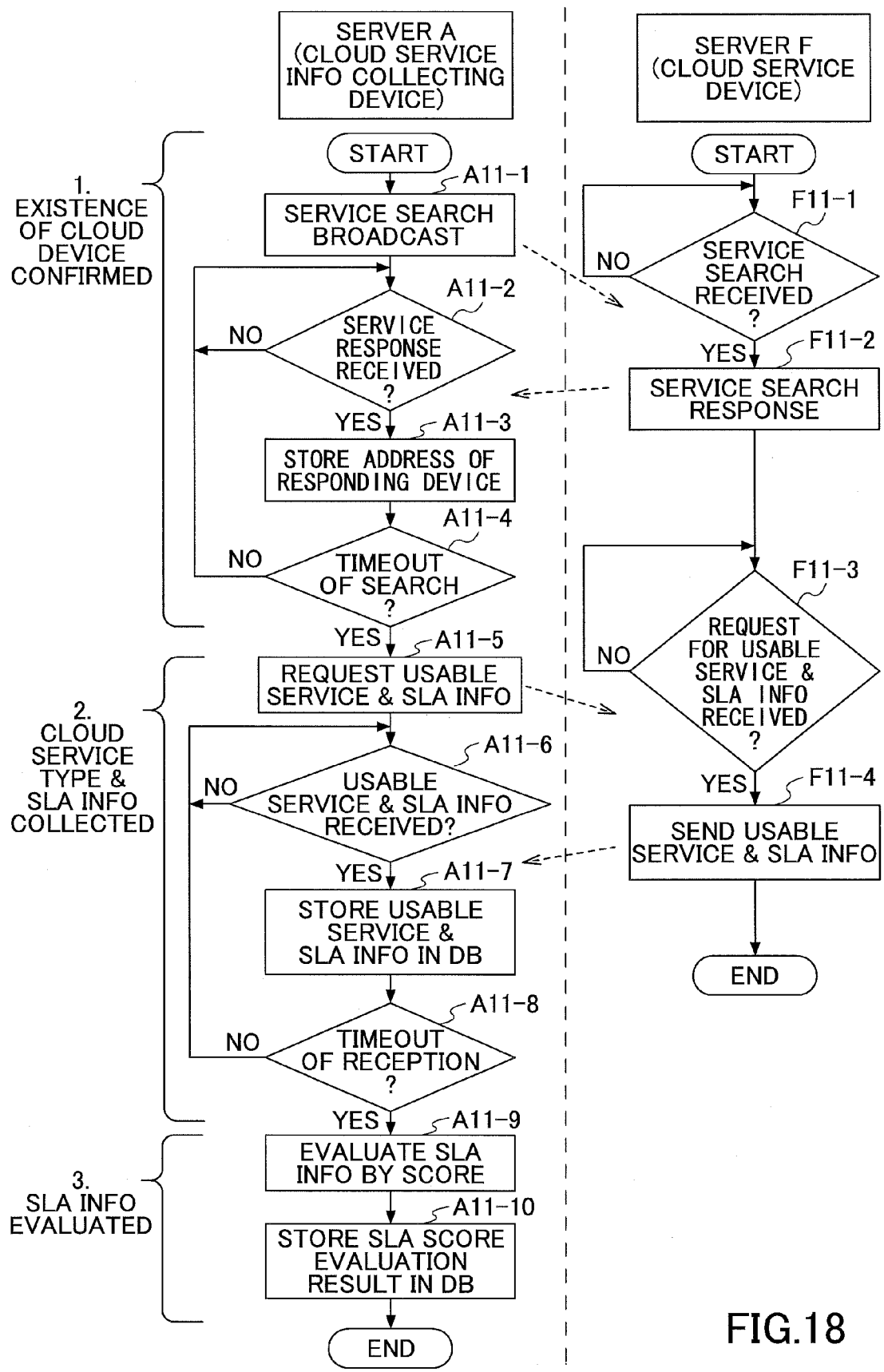
FIG. 18 is a flow chart for explaining an example of a procedure in which usable services and SLA information are laid open to public and collected.

FIG. 18 is a flow chart for explaining an example of a procedure in which usable services and SLA information are laid open to public and collected. In FIG. 18, the server F is illustrated as a representative of the cloud service devices 20, however, other cloud service devices 20 may execute similar processes.

In a step A11-1 illustrated in FIG. 18, the cloud service type and SLA information collection processing part 52 of the cloud service information collecting device 23 sends a packet (that is, a service search packet) for making a service search via the communication control unit 35 to a network recognizable thereby and to a network specified by the manager or the like, in order to search the cloud service devices 20. In this state, the cloud service type and SLA information collection processing part 52 searches the cloud service devices 20 that respond within a predetermined time, and thus, starts a count for timeout monitoring.

In a step F11-2, the cloud service type and SLA information transmission processing part 53 of the server F waits in a state (or is in standby) to receive the service search packet. The cloud service type and SLA information transmission processing part 53 executes a process of a step F11-2 when the service search packet is received.

In the step F11-2, the cloud service type and SLA information transmission processing part 53 responds to the service search and transmits an address (IP address, FQDN, etc.) of the cloud service device 20 (server F) to the cloud service information collecting device 23.

In a step A11-2, the cloud service type and SLA information collection processing part 52 waits (or is in standby) until the response with respect to the service search is received, and executes a process of a step A11-3 when the response is received.

In the step A11-3, the cloud service type and SLA information collection processing part 52 stores the address (IP address, FQDN, etc.) of the cloud service device 20 that responded into the RAM 33 or the storage 41 of the cloud service information collecting device 20 (server A).

In a step A11-4, the cloud service type and SLA information collection processing part 52 returns to the process of the step A11-2 in order to receive other responses, until the timeout of the service search occurs. When the timeout of the service search occurs, the cloud service type and SLA information collection processing part 52 ends receiving the response, and executes a process of a step A11-5.

In the step A11-5, the cloud service type and SLA information collection processing part 52 sends a request packet requesting the usable services and the SLA information via the communication control unit 35, with respect to each cloud service device 20 that responded to the service search. Similarly, a count for timeout monitoring is started in order to search the cloud service devices 20 that respond within a predetermined time.

In a step F11-3, the cloud service type and SLA information transmission processing part 53 waits (or is in standby) until the request packet requesting the usable services and the SLA information is received. When the packet (or request) for the usable services and the SLA information is received, the cloud service type and SLA information transmission processing part 53 executes a process of a step F11-4.

In the step F11-4, the cloud service type and SLA information transmission processing part 53 transmits the usable services and the SLA information retained therein to the cloud service information collecting device 23.

In a step A11-6, the cloud service type and SLA information collection processing part 52 waits (or is in standby) until the usable services and the SLA information are received, and executes a process of a step A11-7 when the usable services and the SLA information are received.

In the step A11-7, the cloud service type and SLA information collection processing part 52 stores the usable services and the SLA information that are received into the cloud service DB 55 and the SLA evaluation DB 54 within the storage 41.

In a step A11-8, when the timeout until the end of reception of the usable services and the SLA information has not occurred, the process returns to the step A11-6 in order to receive the usable services and the SLA information from the other cloud service devices 20. When the timeout until the end of reception of the usable services and the SLA information occurs, the cloud service type and SLA information collection processing part 52 ends waiting (or makes a transition from standby) and executes a process of a step A11-9.

In the step A11-9, the SLA information evaluation processing part 51 evaluates the SLA information stored in the SLA evaluation DB 54 by scores based on the evaluation rule.

In a step A11-10, the SLA information evaluation processing part 51 stores the evaluation result (or scores) in the SLA evaluation DB 54.

The cloud service information collecting device 23 (server A) may retain the cloud service DB 55 and the SLA evaluation DB 54 through the above described process.

No all of the cloud service devices 20 may cope or respond to the collection of the usable services and the SLA information by the cloud service information collecting device 23. Hence, in this embodiment, the manager may manually input the usable services and the SLA information, and register the usable services and the SLA information in the cloud service DB 55 and the SLA evaluation DB 54 of the cloud service information collecting device 23, if necessary.

Figure 19:
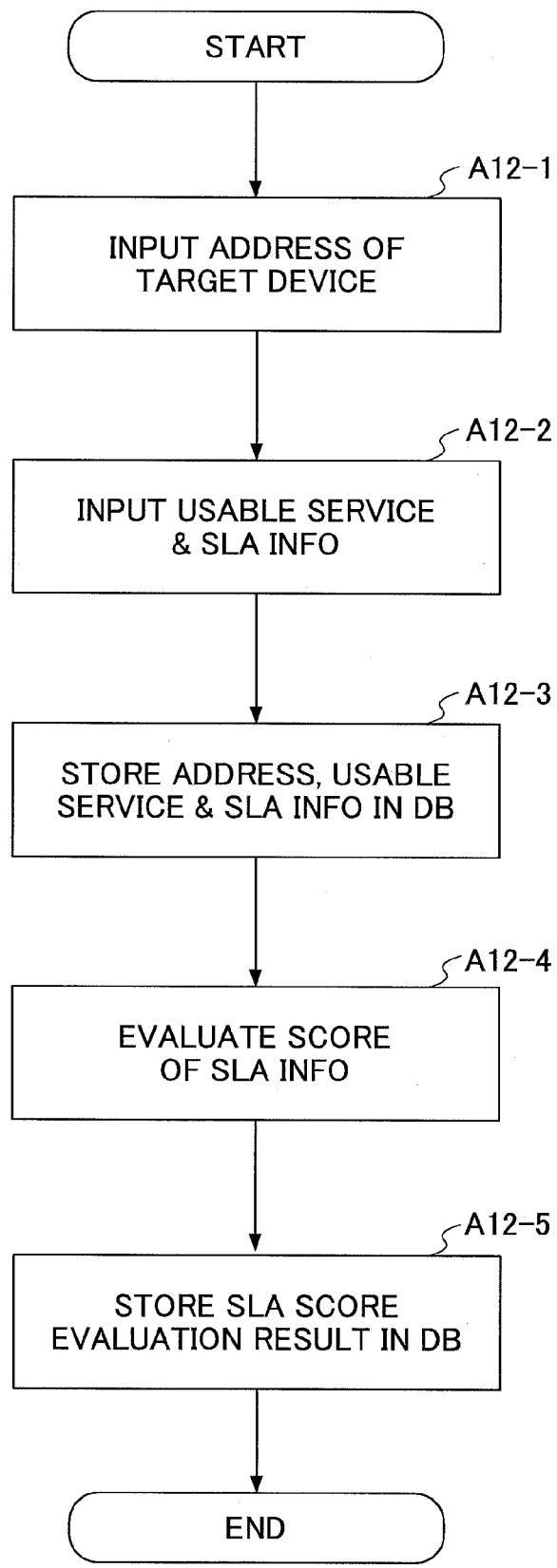
FIG. 19 is a flow chart for explaining an example of a procedure in which a manager registers a cloud service in the cloud service database and the SLA evaluation database.

FIG. 19 is a flow chart for explaining an example of a procedure in which a manager registers a cloud service in the cloud service database and the SLA evaluation database. FIG. 19 illustrates a case in which the usable services and the SLA information are registered in the cloud service DB 55 and the SLA evaluation DB 54 of the cloud service information collecting device 23.

In a step A12-1 illustrated in FIG. 19, the manager performs an operation from the operation panel 125 of the cloud service device 20 that is a registration target, and inputs the address (IP address, FQDN, etc.) of this cloud service equipment.

Figure 20:
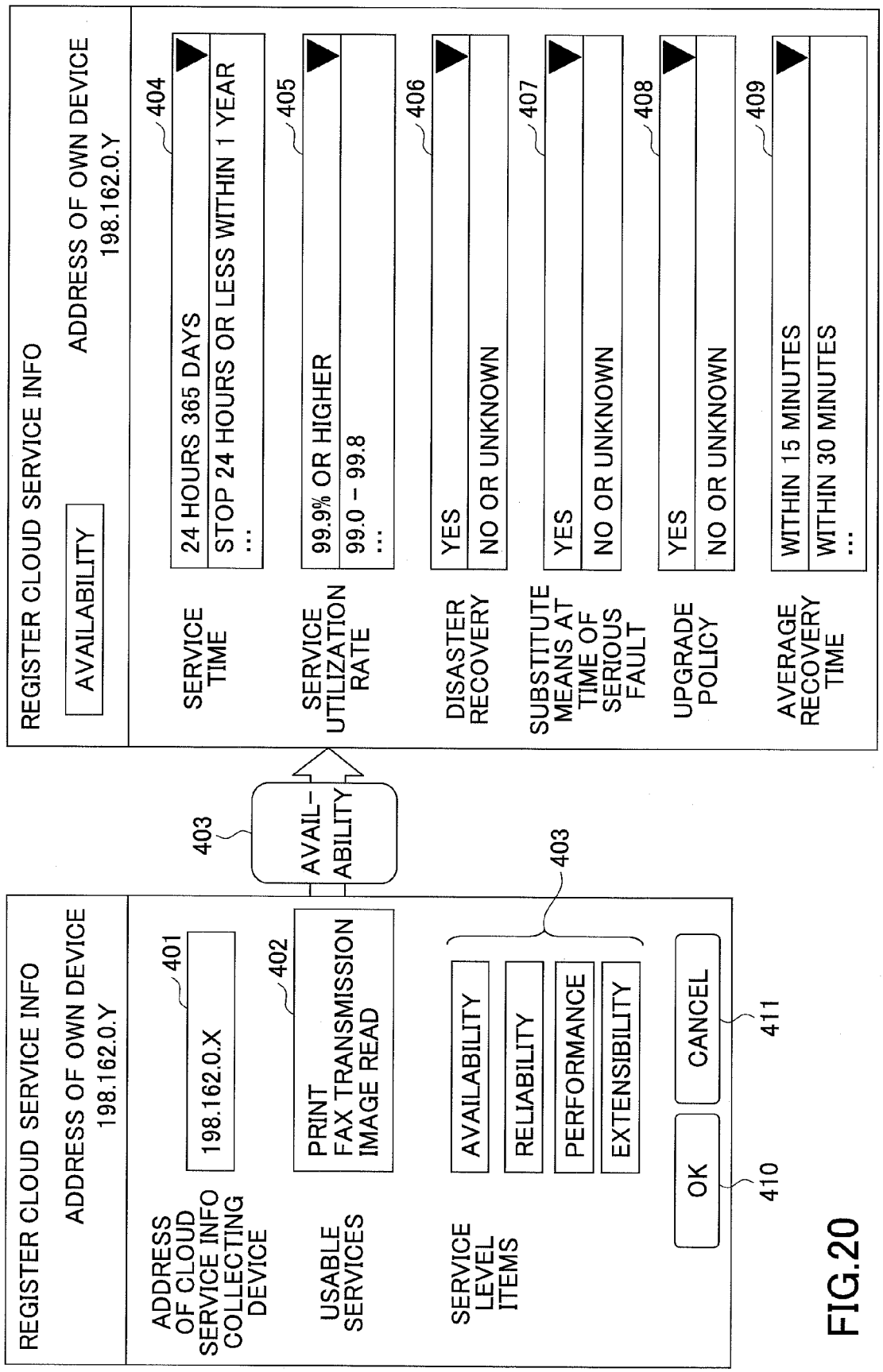
FIG. 20 is a diagram illustrating an example of a cloud service registration screen, displayed on the operation panel, for manually registering cloud services.

FIG. 20 is a diagram illustrating an example of a cloud service registration screen, displayed on the operation panel, for manually registering cloud services. The cloud service registration screen illustrated on the left side in FIG. 20 includes an "address of cloud service information collecting device" field 401, a "usable services" field 402, and four "service level items" selection buttons 403. The four "service level items" selection buttons 403 include an availability button, a reliability button, a performance button, and an extensibility button. The "address of cloud service information collecting device" field 401 indicates the address of the cloud service information collecting device 23 known to the manager. The "usable services" field 402 indicates the services usable by the device 22, that is, the usable services known to the device 22.

The manager may select one selection button 403 for each of the items of the "service level items", in order to select the set value for each service level item. Hence, when the availability selection button 403 is selected, the screen on the right side of FIG. 20 is displayed. In this screen, the "service level items" of the "availability" include the "service time", the "service utilization rate", etc., and the manager may select the "set value", one by one, for each of the "service level items". In this example, the manager may select the "set value" from each of pull-down menus 404 through 409 displayed on the screen.

When the manager selects an OK button 410, the cloud service registration accepting part 66 of the device sends the IP address thereof, the usable services, and the SLA information to the cloud service information collecting device 23. On the other hand, when the manager selects a cancel button 411, the device 22 does not perform any operation.

In a step A12-2 illustrated in FIG. 19, the manager performs an operation from the operation panel 125 displaying the screen illustrated in FIG. 20 and inputs the usable services and the SLA information. Hence, the operation from the operation panel 125 causes the usable services and the SLA information to be sent to the cloud service information collecting device 23.

In a step A12-3, the cloud service type and SLA information collection processing part 52 of the cloud service information collecting device 23 stores the address, usable services, and SLA information of the cloud service device 20 in the cloud service DB 55 and the SLA evaluation DB 54 within the RAM 33 or the storage 41.

In a step A12-4, the SLA information evaluation processing part 51 evaluates the SLA information by scores based on the evaluation rule.

In a step A12-5, the SLA information evaluation processing part 51 stores the evaluation result in the SLA evaluation DB 54.

Figure 21:
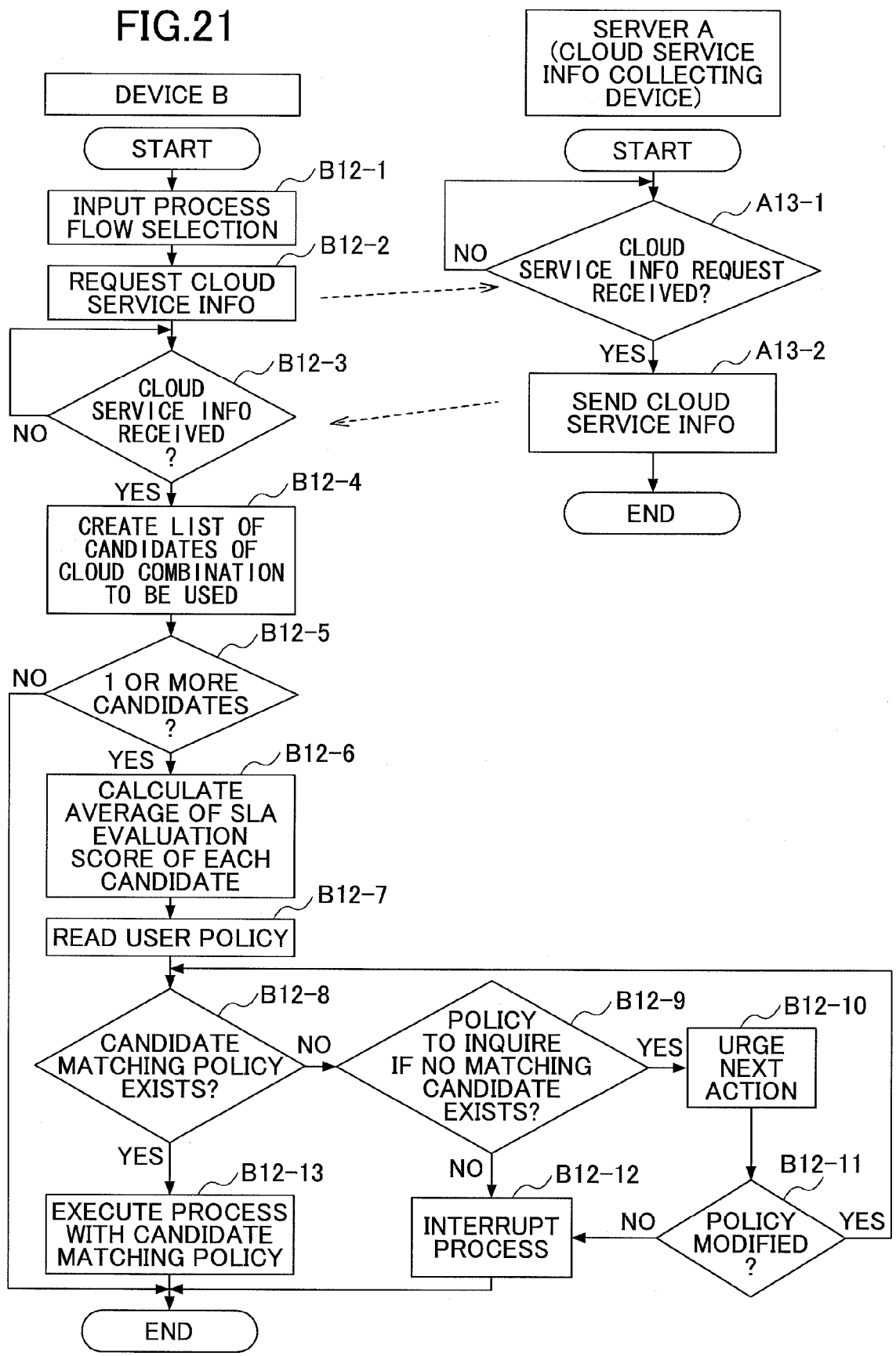
FIG. 21 is a flow chart for explaining an example of a procedure in which the cloud service device is selected according to the user policy when a user CCC performs the process flow using the cloud computing environment.

Next, a description will be given of the determination and the like of the cloud service device 20, by referring to FIG. 21. FIG. 21 is a flow chart for explaining an example of a procedure in which the cloud service device is selected according to the user policy when the user CCC performs the process flow using the cloud computing environment. FIG. 21 illustrates the procedure for a case in which the device B selects the cloud service device 20 according to the user policy.

In a step B12-1 illustrated in FIG. 21, the user CCC first performs an operation from the operation panel 125 of the device B in order to input the process flow. Because the user CCC is already logged in to the device B, the device B may recognize the user CCC.

In a step B12-2, in order to receive the usable services and the SLA information from the cloud service information collecting device 23, the cloud service information acquiring part 62 of the device B sends a request packet requesting the usable services and the SLA information to the cloud service information collecting device 23 via the communication control unit 35.

In a step A13-1, the cloud service information collecting device 23 waits until the request packet requesting the usable services and the SLA information is received. A process of a step A13-2 is executed when the request packet requesting the usable services and the SLA information is received.

In the step A13-2, the cloud service type and SLA information transmission processing part 53 transmits the usable services and the SLA information requested by the request packet to the device B.

In a step B12-3, the device B waits until the usable services and the SLA information are received. A process of a step B12-4 is executed when the usable services and the SLA information are received. On the other hand, in limited situations in which the usable service and the SLA information cannot be received due to causes, such as the cloud service information collecting device 23 not being started, the device B sends the request packet again.

In the step B12-4, the cloud candidate selecting part 63 creates a list of candidates of the combination of the usable cloud service devices 20, such as that illustrated in FIG. 14, from the cloud service information that is received.

In a step B12-5, the cloud candidate selecting part 63 confirms whether one or more candidates of the combination of cloud service devices 20 exist, and a process of a step B12-6 is executed when one or more candidates exist. On the other hand, when no candidate of the combination of cloud service devices 20 exists, the device B ends the process illustrated in FIG. 21 because there is no usable service, unlike the case in which the user policy is not satisfied.

In the step B12-6, the cloud service determining part 64 calculates the sum total score and the average score for each type with respect to each candidate of the combination of cloud service devices 20, from the SLA information (scores) that is received.

In a step B12-7, the cloud service determining part 64 reads the user policy of the user CCC from the policy DB 67.

In a step B12-8, the cloud service determining part 64 compares the user policy of the user CCC and the sum total average score and/or the type average score (that is, average score by type), and judges whether a candidate combination of the cloud service devices 20 satisfying the user policy exists. A process of a step B12-13 is executed when the candidate combination exists. On the other hand, a process of a step B12-9 is executed when the candidate combination does not exist.

In the step B12-9, the cloud service determining part 64 confirms whether to inquire the user CCC by referring to the user policy, because the candidate combination of the cloud service devices 20 satisfying the user policy does not exist. When the user policy does not include making the inquiry, the cloud service determining part 64 executes a process of a step B12-12.

In a step B12-10, the cloud service determining part 64 displays on the operation panel 125 a message indicating that there is no combination of cloud service devices 20 satisfying the user policy, and urges the user CCC to make a next action (or operation). The next action may be modifying the condition, interrupting the process, and the like.

In a step B12-11, the cloud service determining part 64 confirms whether the condition of the user policy of the user CCC has been modified. When the user policy has been modified (user selects the "register" button 203), the process of the step B12-8 is executed. On the other hand, when the user policy has not been modified (user selects the "cancel" button 205 or, the user policy is not modified by the selection of the "register" button 203), the process of the step B12-12 is executed.

In the step B12-12, the device B interrupts the process and the process ends. In this case, the screen returns to the process flow input screen.

In the step B12-13, the process flow executing part 65 starts providing the cloud computing service using the candidate of the combination of cloud service devices 20 satisfying the user policy of the user CCC with the highest score.

Figure 22:
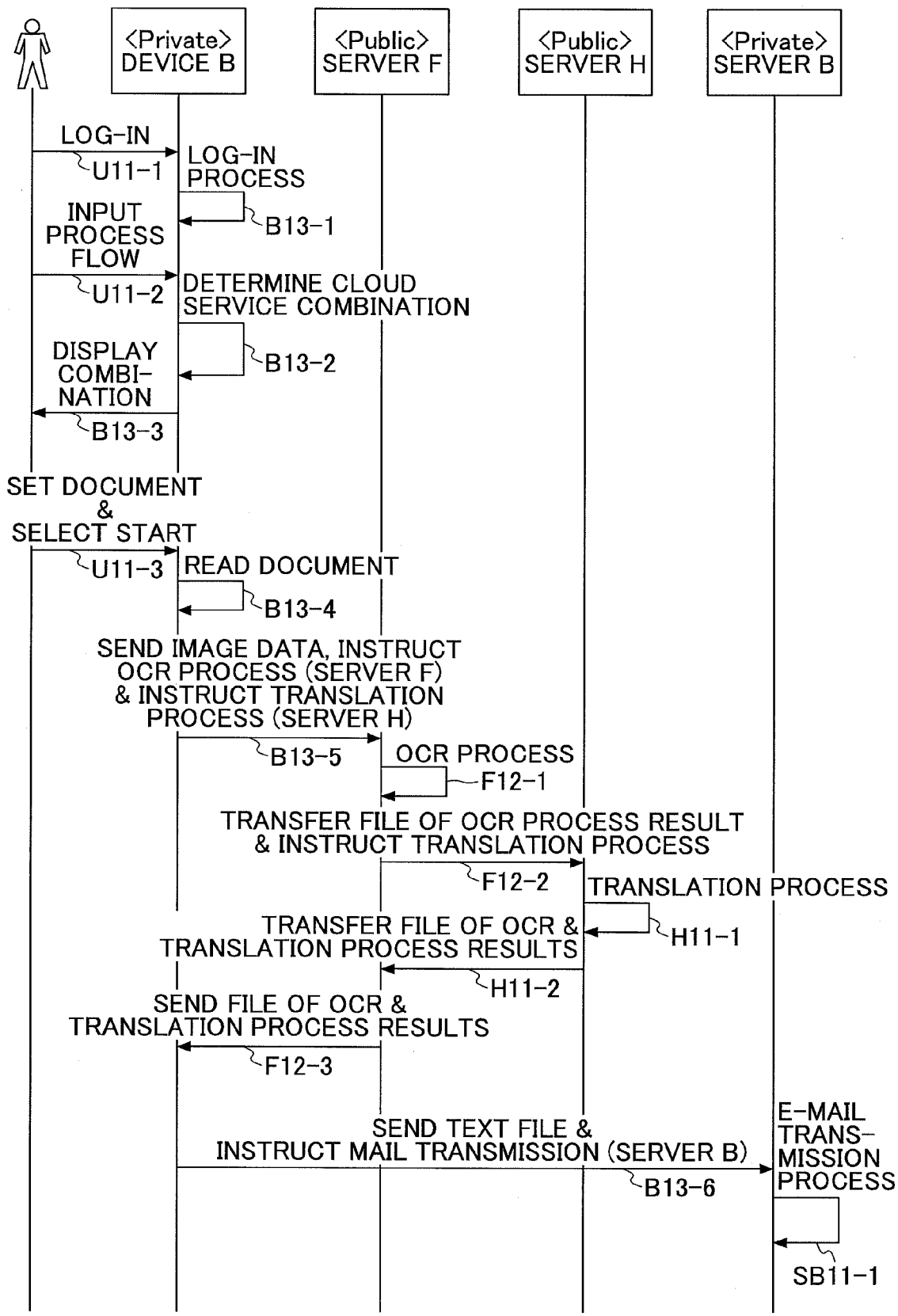
FIG. 22 is a sequence diagram for explaining an example of a procedure in which a device B provides a service to the user CCC by the candidate of the cloud service combination.

FIG. 22 is a sequence diagram for explaining an example of a procedure in which the device B provides a service to the user CCC by the candidate of the cloud service combination. FIG. 22 illustrates the procedure for a case in which the process flow executing part 65 of the device B provides the service. A part of the procedure illustrated in FIG. 22 is the same as that illustrated in FIG. 21.

In a step U11-1 illustrated in FIG. 22, the user CCC first makes a log-in to the device B. The method of making the log-in is not limited to, but may include, inputting the user name and password, or causing an IC card carried by the user to be read.

In a step B13-1, the device B performs a log-in process. That is, the device B authenticates the user CCC, and displays the user name on the screen when the authentication is successful.

In a step U11-2, the user CCC inputs the process flow, and selects the "execute process" button 305.

In a step B13-2, the device B executes the procedure illustrated in FIG. 21, and determines the combination of the cloud service devices 20.

In a step 313-3, the process flow executing part 65 displays the candidate of the determined combination of the cloud service devices 20 on the operation panel 125, and accepts an instruction indicating whether the process flow may be executed using the candidate of the determined combination. The display of the candidate of the determined combination may be omitted. In addition, a plurality of combinations of the cloud service devices 20 may be displayed as candidates for selection by the user CCC.

In a step U11-3, the user CCC sets a document on an ADF (Automatic Document Feeder) or a contact glass, and selects a start key. Each cloud service device 20 executes the process in an order according to the process flow.

In a step B13-4, the device B first reads the document. Hence, image data of the read document is generated.

In a step B13-5, the process flow executing part 65 creates process instructions based on the process flow, and sends the process instructions to the server F. The process instructions based on the process flow may differ depending on whether the process is completed within the private cloud. This is because the access from the public cloud to the private cloud (other than device B) is excluded by the firewall. In the process flow illustrated in FIG. 22, the servers F and H exist within the public cloud, and the server B exists in the private cloud. For this reason, the device B separately makes the process instruction of the public cloud and the process instruction of the private cloud.

First, the process flow executing part 65 sends an image data and OCR process instruction (server F) and a translation process instruction (server H) to the server F. By integrating a plurality of process instructions into a single process instruction, the device B may suppress the communication traffic and minimize the data communication with the public cloud.

In a step F12-1, the server F obtains one process instruction addressed thereto in accordance with the order of the process flow, and performs the OCR process on the image data.

In a step F12-2, the server F sends the file (text data) of the results of the OCR process and the remaining process instruction (in this example, the translation process instruction) to the server H.

In a step H11-1, the server H performs the translation process on the file (text data) of the results of the OCR process.

In a step H11-2, the server H sends a file (text data) of the results of the OCR and translation processes to the server F. In other words, because the access from the server H of the public cloud to the server B of the private cloud is prohibited by the firewall, the server H once sends the file (text data) of the results of the OCR and translation processes to the server F.

In a step F12-3, the server F sends the file (text data) of the results of the OCR and translation processes to the server B. Because the device B waits for the response from the server F with respect to a HTTP (HyperText Transfer Protocol) request, the server F may send the file (text data) of the results of the OCR and translation processes to the server B through the firewall.

In a step B13-6, the process flow executing part 65 sends a text file and e-mail transmission instruction (server B) to the server B, as a process instruction with respect to the private cloud.

In a step SB11-1, the server B sends the file (text data) of the results of the OCR and translation processes by e-mail to the specified address.

Accordingly, each of the cloud service devices may interact or link to execute each process of the process flow. Of course, instead of collectively sending the process instructions in the step B13-5, the device B may send the process instruction to each cloud service device 20 for each process step. In addition, in a case in which the entire process flow includes the processes in the public cloud or, a latter half of the process flow includes the processes in the public cloud, the device B may send in one transmission all of the process instructions of the process flow to the cloud service device 20 that first processes the process flow.

Therefore, in the information processing system 100 of this embodiment, the SLA information made public by the cloud service devices 20 is collected, and the cloud service devices 20 are selected based on the user policy. As a result, the information processing system 100 enables the cloud services to be dynamically selected according to the needs of the user.

Further, the present invention is not limited to these embodiments, but various variations and modifications may be made without departing from the scope of the present invention.

What is claimed is:

1. An information processing apparatus connected via a network to a plurality of service providing devices and a predetermined information processing apparatus, comprising:
   a central processing unit that controls the information processing apparatus; and
   a memory that stores instructions to be executed by the central processing unit of the information processing apparatus so as to perform a method including the steps of:
   accepting a type of service;

acquiring a selection policy for selecting the service providing devices that lay open to public types of providable services and service level information;

acquiring service type information and the service level information from the predetermined information processing apparatus which detects the service providing devices and collects the service type information including the types of providable services of the service providing devices and the service level information;

selecting the service providing devices that provide the type of service accepted by the accepting step based on the service type information;

determining one or more service providing devices, from the service providing devices selected by the selecting step, according to the selection policy, and performing the service by the selected one or more service providing devices, each of the selected one or more service providing devices providing at least one of an Optical Character Recognition process, and an electronic mail transmission process as services, wherein the determining step selects the one or more service providing devices according to the service level information acquired from the predetermined information processing apparatus and the selection policy acquired from the policy acquiring step, wherein the service providing devices include cloud service devices and server devices, and the services includes cloud services, wherein the selecting step further extracts candidate combinations of the cloud service devices and the server devices from combinations of the cloud service devices and the server devices that achieve a process flow of a plurality of types of services, said each of the plurality of types of the services being accepted by the accepting step, wherein the determining step further selects one or more candidates of the combinations of the cloud service devices and the server devices based on a value calculated according to the selection policy, said selection policy including information indicating how item score and type score that are stored in a service level agreement database are applied to the selection of the one or more candidates of the combinations of the cloud service devices and the server devices, wherein each of the service providing devices lays open to public the service level information for each of a plurality of items of a service level judging index;

when the policy acquiring step acquires a selection policy to select an item and the service providing device having a highest score for the item, the determining step selects one or more service providing devices from the service providing devices selected by the selecting step in an order starting from the service providing device having a highest score for the item of the service level information selected by the selection policy, wherein, when the accepting step accepts a plurality of service types to be processed time-sequentially, the selecting step specifies the service providing devices that provide the service types accepted by the accepting step for each process based on the service type information, and selects candidates of a combination of the service providing devices;

wherein the determining step selects one or more combinations of the service providing devices from the candidates selected by the selecting step, and wherein, when the policy acquiring step acquires a selection policy to select at least one of the plurality of items and a lower limit service level value for each selected item, the determining step calculates a statistic value of the service level information only for the selected item by the selection policy for each of the candidates, and selects one or more combinations of the service providing devices having the statistic value greater than or equal to the lower limit service level value of the each selected item, said lower limit service level value for the each selected item being individually set by a user from a user device.

2. The information processing apparatus as claimed in claim 1, wherein:

when the policy acquiring step accepts a selection policy to select the service providing device having a highest statistic value of the service level information of a plurality of items, the determining step calculates the statistic value of the service level information of the plurality of items for each of the candidates, and selects one or more combinations of the service providing devices in an order starting from the service providing device having a highest statistic value.

3. The information processing apparatus as claimed in claim 1, wherein:

when the policy acquiring step acquires a selection policy to select the item and the service providing device having a highest score for the item, the determining step calculates the statistic value of the service level information only for the item selected by the selection policy for each of the candidates, and selects one or more combinations of the service providing devices in an order starting from the service providing device having a highest statistic value.

4. The information processing apparatus as claimed in claim 1, wherein the plurality of items of the service level information include at least two items selected from a group consisting of availability, reliability, performance, and extensibility.

5. The information processing apparatus as claimed in claim 1, wherein the service level information includes numerical values corresponding to the plurality of items prescribed by Service Level Agreement (SLA) according to service levels.

6. The information processing apparatus as claimed in claim 1, wherein:

when the determining step is unable to select one or more combinations of the service providing devices based on the selection policy acquired by the policy acquiring step, the policy acquiring step again accepts the selection policy for the service providing devices.

7. The information processing apparatus as claimed in claim 1, wherein the method further comprises:

a registration accepting step accepts input of the service type of a service providing device and the service level information, wherein the registration accepting step sends identification information of the service providing device, the service type, and the service level information to the predetermined information processing apparatus.

8. The information processing apparatus as claimed in claim 1, wherein:

when a part of the plurality of service providing devices is coupled to a public network on an outer side of a firewall when viewed from the information processing apparatus, and a remaining part of the plurality of service providing devices is coupled to a private network on an inner side of the firewall when viewed from the information processing apparatus, one of the plurality of service providing devices coupled to the public network and included in the combination of the service providing devices determined by the determining step includes a process executing step configured to request execution of processes of a plurality of services simultaneously.

9. The information processing apparatus as claimed in claim 8, wherein the process executing step, after acquiring a process result of a service of a service processing device coupled to the public network, requests a service providing device coupled to the private network to execute a process.

10. The information processing apparatus as claimed in claim 1, wherein the service includes a print function, a scanner function, a facsimile function, and a copy function.

11. The information processing apparatus as claimed in claim 1, wherein the information processing apparatus is a server apparatus, and the predetermined information processing apparatus is one of a personal computer and a multifunctional peripheral.

12. An information processing system comprising:
a plurality of service providing devices configured to lay open to public service types that are providable thereby and service level information, and
first and second information processing apparatuses coupled to the service providing devices via a network and configured to receive services from the service providing devices, wherein the first information processing apparatus including:
a first central processing unit that controls the information processing apparatus; and
a first memory that stores instructions to be executed by the first central processing unit so as to perform a method including the steps of:
detecting the service providing devices on the network; and
collecting service type information including the service type providable by the service providing devices and the service level information, and
said second information processing apparatus including:
a second central processing unit that controls the information processing apparatus; and
a second memory that stores instructions to be executed by the second central processing unit so as to perform a method including the steps of:
accepting the service type;
acquiring a selection policy for selecting the service providing devices;
acquiring the service type information and the service level information from the first information processing apparatus;
selecting the service providing devices that provide the type of service accepted by the accepting step based on the service type information;
determining one or more service providing devices, from the service providing devices selected by the selecting step, according to the selection policy, and
performing the service by the selected one or more service providing devices, each of the selected one or more service providing devices providing at least one of an Optical Character Recognition process, and an electronic mail transmission process as services,
wherein the determining step selects the one or more service providing devices according to the service level information acquired from the first information processing apparatus and the selection policy acquired from the policy acquiring step,
wherein the service providing devices include cloud service devices and server devices, and the services includes cloud services,
wherein the selecting step further extracts candidate combinations of the cloud service devices and the server devices from combinations of the cloud service devices and the server devices that achieve a process flow of a plurality of types of services, said each of the plurality of types of the services being accepted by the accepting step,
wherein the determining step further selects one or more candidates of the combinations of the cloud service devices and the server devices based on a value calculated according to the selection policy, said selection policy including information indicating how item score and type score that are stored in a service level agreement database are applied to the selection of the one or more candidates of the combinations of the cloud service devices and the server devices,
wherein each of the service providing devices lays open to public the service level information for each of a plurality of items of a service level judging index;
when the policy acquiring step acquires a selection policy to select an item and the service providing device having a highest score for the item, the determining step selects one or more service providing devices from the service providing devices selected by the selecting step in an order starting from the service providing device having a highest score for the item of the service level information selected by the selection policy,
wherein, when the accepting step accepts a plurality of service types to be processed time-sequentially, the selecting step specifies the service providing devices that provide the service types accepted by the accepting step for each process based on the service type information, and selects candidates of a combination of the service providing devices;
wherein the determining step selects one or more combinations of the service providing devices from the candidates selected by the selecting step, and
wherein, when the policy acquiring step acquires a selection policy to select at least one of the plurality of items and a lower limit service level value for each selected item, the determining step calculates a statistic value of the service level information only for the selected item by the selection policy for each of the candidates, and selects one or more combinations of the service providing devices having the statistic value greater than or equal to the lower limit service level value of the each selected item, said lower limit service level value for the each selected item being individually set by a user from a user device.

13. The information processing system as claimed in claim 12, wherein the method further includes:
converting the service level information to service level values according to service levels; and
converting the service level information into the service level values based on the conversion rule table,
wherein the determining step selects the service providing device having the service level value converted from the service level information by the converting step greater than or equal to a value accepted as the selection policy by the policy accepting step.

14. The information processing system as claimed in claim 12, wherein:

a part of the plurality of service providing devices is coupled to a public network on an outer side of a firewall when viewed from the second information processing apparatus;

a remaining part of the plurality of service providing devices is coupled to a private network on an inner side of the firewall when viewed from the second information processing apparatus; and the collecting step collects the service type information indicating the types of services providable by the service providing devices and the service level information, without distinguishing the public network and the private network.

15. The information processing system as claimed in claim 12, wherein:

the method further includes a registration accepting step that accepts input of the service type of a service providing device and the service level information; and the collecting step collects identification information of the service providing device, the service type, and the service level information accepted by the registration accepting step.

16. An information processing apparatus connected to a predetermined information processing apparatus via a network, the predetermined information processing apparatus including a first central processing unit that controls the information processing apparatus; and a first memory that stores instructions to be executed by the first central processing unit so as to perform a method including the steps of:

acquiring a selection policy for selecting the service providing devices that lay open to public types of providable services and service level information, acquiring service type information and the service level information from the predetermined information processing apparatus which detects the service providing devices and collects the service type information including the types of providable services of the service providing devices and the service level information, selecting the service providing devices that provide the type of service accepted by the accepting step based on the service type information, and determining one or more service providing devices, from the service providing devices selected by the selecting step, according to the selection policy, and performing the service by the selected one or more service providing devices, each of the selected one or more service providing devices providing at least one of an Optical Character Recognition process and an electronic mail transmission process as services, wherein the information processing apparatus comprises:

a second central processing unit that controls the information processing apparatus; and a second memory that stores instructions to be executed by the second central processing unit so as to perform a method including the steps of:

detecting the service providing devices;

collecting the service type information including the types of services providable by the service providing devices and the service level information; and sending the service type information and the service level information to the predetermined information processing apparatus, wherein the determining step selects the one or more service providing devices according to the service level information acquired from the predetermined information processing apparatus and the selection policy acquired from the policy acquiring step, wherein the service providing devices include cloud service devices and server devices, and the services includes cloud services, wherein the selecting step further extracts candidate combinations of the cloud service device and the server device from combinations of the cloud service devices and the server devices that achieve a process flow of a plurality of types of services, said each of the plurality of types of the services being accepted by the accepting step, wherein the determining step further selects one or more candidates of the combinations of the cloud service devices and the server devices based on a value calculated according to the selection policy, said selection policy including information indicating how item score and type score that are stored in a service level agreement database are applied to the selection of the one or more candidates of the combinations of the cloud service devices and the server devices, wherein each of the service providing devices lays open to public the service level information for each of a plurality of items of a service level judging index;

when the policy acquiring step acquires a selection policy to select an item and the service providing device having a highest score for the item, the determining step selects one or more service providing devices from the service providing devices selected by the selecting step in an order starting from the service providing device having a highest score for the item of the service level information selected by the selection policy, wherein, when the accepting step accepts a plurality of service types to be processed time-sequentially, the selecting step specifies the service providing devices that provide the service types accepted by the accepting step for each process based on the service type information, and selects candidates of a combination of the service providing devices;

wherein the determining step selects one or more combinations of the service providing devices from the candidates selected by the selecting step, and wherein, when the policy acquiring step acquires a selection policy to select at least one of the plurality of items and a lower limit service level value for each selected item, the determining step calculates a statistic value of the service level information only for the selected item by the selection policy for each of the candidates, and selects one or more combinations of the service providing devices having the statistic value greater than or equal to the lower limit service level value of the each selected item, said lower limit service level value for the each selected item being individually set by a user from a user device.

* * * * *